US012588016B2

(12) United States Patent
Xuan et al.

(10) Patent No.: US 12,588,016 B2
(45) Date of Patent: Mar. 24, 2026

(54) SIGNAL PROCESSING METHOD AND APPARATUS

(71) Applicant: HUAWEI TECHNOLOGIES CO., LTD., Shenzhen (CN)

(72) Inventors: Yidi Xuan, Beijing (CN); Xinqian Xie, Beijing (CN); Zhiheng Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 440 days.

(21) Appl. No.: 18/192,167

(22) Filed: Mar. 29, 2023

(65) Prior Publication Data

US 2023/0239861 A1     Jul. 27, 2023

Related U.S. Application Data

(63) Continuation of application No. PCT/CN2020/119425, filed on Sep. 30, 2020.

(51) Int. Cl.
| | |
|---|---|
| *H04W 72/12* | (2023.01) |
| *H04L 5/00* | (2006.01) |
| *H04W 72/121* | (2023.01) |
| *H04W 72/23* | (2023.01) |

(52) U.S. Cl.
CPC ......... *H04W 72/121* (2013.01); *H04L 5/0051* (2013.01); *H04W 72/23* (2023.01)

(58) Field of Classification Search
CPC ..... H04W 72/12; H04W 72/23; H04W 72/04; H04W 72/53; H04W 72/54; H04L 5/00; H04L 5/10; H04L 5/02; H04L 27/26

USPC ......................................................... 370/329
See application file for complete search history.

(56) References Cited

U.S. PATENT DOCUMENTS

| | | | | |
|---|---|---|---|---|
| 9,338,673 | B2 * | 5/2016 | Cheng ................. | H04J 11/0056 |
| 9,351,312 | B2 * | 5/2016 | Reial ..................... | H04L 5/0053 |
| 9,420,476 | B2 * | 8/2016 | Koutsimanis .......... | H04J 11/005 |
| 9,843,942 | B2 * | 12/2017 | Cheng ................. | H04J 11/0093 |
| 10,057,027 | B2 * | 8/2018 | Kim ...................... | H04L 5/0048 |

(Continued)

FOREIGN PATENT DOCUMENTS

| | | |
|---|---|---|
| CN | 105532061 A | 4/2016 |
| CN | 106856426 A | 6/2017 |

(Continued)

OTHER PUBLICATIONS

Chinese Office Action issued in corresponding Chinese Application No. 202080105683.0, dated Feb. 24, 2025, pp. 1-9.

(Continued)

*Primary Examiner* — Man U Phan
(74) *Attorney, Agent, or Firm* — HAUPTMAN HAM, LLP

(57) ABSTRACT
A signal processing method includes receiving, by a terminal, first indication information and second indication information. The first indication information indicates at least one first resource block group. The second indication information indicates a second resource block group. The second resource block group belongs to the at least one first resource block group. The signal processing method also includes receiving, by the terminal, a downlink signal on the at least one first resource block group. The signal processing method further includes processing the downlink signal based on the second indication information.

20 Claims, 6 Drawing Sheets

(56)                    References Cited

U.S. PATENT DOCUMENTS

| | | | | |
|---|---|---|---|---|
| 10,069,524 | B2 * | 9/2018 | Suzuki | H04J 11/0053 |
| 10,084,564 | B2 * | 9/2018 | Lim | H04W 56/003 |
| 10,148,379 | B2 * | 12/2018 | Jung | H04L 5/0073 |
| 10,256,855 | B2 * | 4/2019 | Xu | H04W 24/02 |
| 10,348,432 | B2 * | 7/2019 | Chen | H04J 11/0036 |
| 10,728,904 | B2 * | 7/2020 | Yang | H04W 72/04 |
| 11,582,707 | B2 * | 2/2023 | Ma | H04L 5/0048 |
| 12,058,686 | B2 * | 8/2024 | Kim | H04L 5/0035 |
| 2016/0226534 | A1 | 8/2016 | Suzuki et al. | |
| 2022/0104182 | A1 | 3/2022 | Kim et al. | |

FOREIGN PATENT DOCUMENTS

| | | | |
|---|---|---|---|
| CN | 108370510 | A | 8/2018 |
| CN | 110545164 | A | 12/2019 |
| WO | 2015116383 | A1 | 8/2015 |
| WO | 2020166976 | A1 | 8/2020 |

OTHER PUBLICATIONS

Extended European Search Report issued in corresponding European Application No. 20955703.2, dated Oct. 11, 2023, pp. 1-8.
LG Electronics Enhancements on mufti-TRP/paneltransmission 3GPP TSG RAN WG1 Meeting #96bis R1-1904208, Apr. 8-12, 2019, total 14 pages.

* cited by examiner

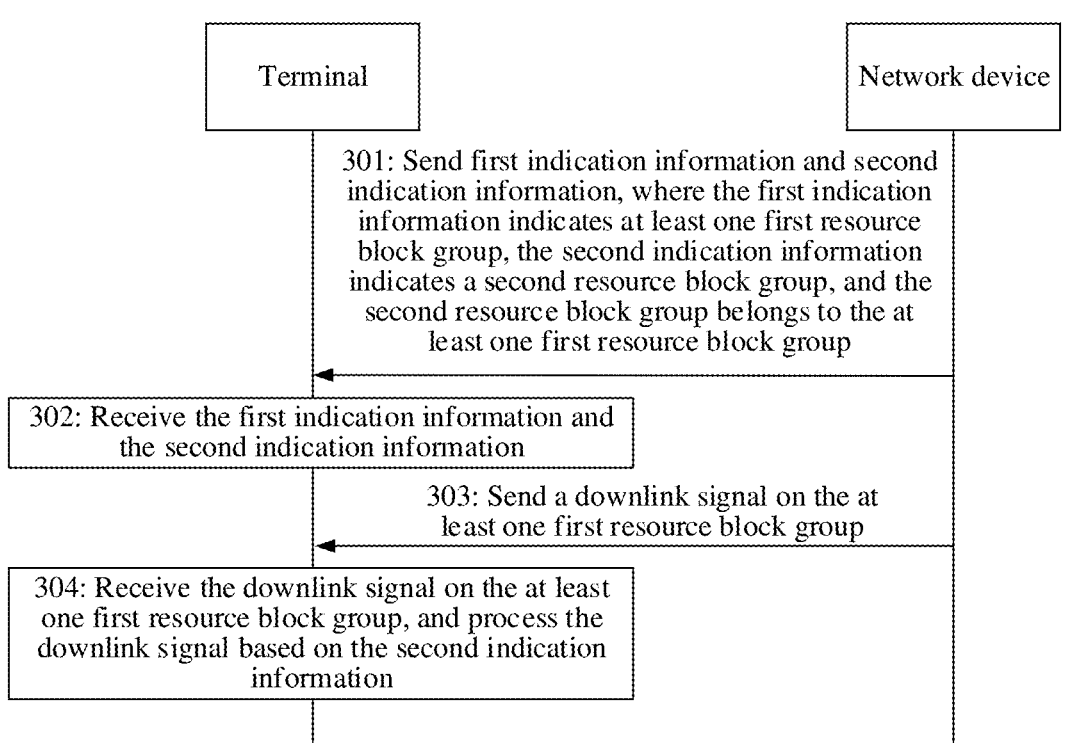

| Terminal | | Network device |
|---|---|---|

301: Send first indication information and second indication information, where the first indication information indicates at least one first resource block group, the second indication information indicates a second resource block group, and the second resource block group belongs to the at least one first resource block group 302: Receive the first indication information and the second indication information 303: Send a downlink signal on the at least one first resource block group 304: Receive the downlink signal on the at least one first resource block group, and process the downlink signal based on the second indication information

FIG. 3A

- Bandwidth part indicator
- Frequency domain resource assignment
- ...
- PRB bundling size indicator
- ...
- Antenna port second indication information
- ...

FIG. 3B

| RB 0 | RB 1 | RB 2 | RB 3 | RB 4 | RB 5 | RB 6 | RB 7 |
|---|---|---|---|---|---|---|---|

| Resource block group 0 | Resource block group 1 | Resource block group 2 | Resource block group 3 |
|---|---|---|---|

First resource block group

SIGNAL PROCESSING METHOD AND APPARATUS

CROSS-REFERENCE TO RELATED APPLICATIONS

This application is a continuation of International Application No. PCT/CN2020/119425, filed on Sep. 30, 2020, the disclosure of which is hereby incorporated by reference in its entirety.

TECHNICAL FIELD

This application relates to the field of communication technologies, and in particular, to a signal processing method and an apparatus.

BACKGROUND

In a 5G new radio (NR) system and a long term evolution ( ) system, a commonly used multiple access manner is an orthogonal frequency division multiple access (OFDMA) manner. A main feature of the orthogonal frequency division multiple access manner is that a transmission resource is divided into mutually orthogonal time-frequency resource elements (REs), and signals sent by a transmitting end are all carried on the REs and transmitted to a receiving end. Because different REs are mutually orthogonal, the receiving end can independently receive the signal sent on each RE. In consideration of a fading characteristic of a radio channel, the signal carried on the RE is distorted after being transmitted through the channel. Usually, this channel distortion is referred to as a channel coefficient. To recover the signal at the receiving end, the channel coefficient is estimated. Usually, a solution based on a reference signal is used. To be specific, a transmitting end transmits a known signal on a specific RE, and a receiving end estimates a channel coefficient based on a received signal and the known signal, and performs interpolation on a channel coefficient on another RE based on the channel coefficient obtained through estimation, to receive and demodulate a data signal based on the channel coefficient obtained through estimation.

In addition, in a wireless communication system, a base station end is equipped with a plurality of antennas to implement spatial multiplexing transmission by using a multiple-input multiple-output (MIMO) technology. To be specific, a plurality of data streams are transmitted on a same time-frequency resource, each data stream is transmitted on an independent spatial layer, and each spatial layer is mapped to a different antenna port for sending. Considering that channel coefficients from different antenna ports to a terminal are different, to enable the receiving end to obtain information transmitted on a plurality of spatial layers, a channel coefficient between each antenna port and the terminal is estimated. Therefore, a different demodulation reference signal (DMRS) is configured for each antenna port, and DMRSs corresponding to different antenna ports may be multiplexed in manners such as time division, frequency division, and code division.

Data streams corresponding to different antenna ports are transmitted on the same time-frequency resource. As a result, when demodulating a received signal to obtain a data stream corresponding to an antenna port, the terminal is interfered with by another antenna port, in other words, receives an interfering signal. To correctly demodulate the received signal and reduce adverse impact caused by the interfering signal, interference suppression processing is performed on the received signal on each resource block group. This type of processing leads to a problem of high processing complexity of the terminal.

SUMMARY

Embodiments of this application provide a signal processing method and an apparatus, to reduce complexity of a process in which a terminal processes an interfering signal.

According to a first aspect, an embodiment of this application provides a signal processing method. The method includes:

A terminal receives first indication information and second indication information, where the first indication information indicates at least one first resource block group, the second indication information indicates a second resource block group, and the second resource block group belongs to the at least one first resource block group; and the terminal receives a downlink signal on the at least one first resource block group, and processes the downlink signal based on the second indication information.

In this embodiment of this application, a network device indicates, to the terminal, the first resource block group in which the downlink signal is located, and indicates the second resource block group related to an interfering signal, so that the terminal can correctly demodulate the downlink signal sent by the network device, and obtain data transmitted in the downlink signal corresponding to the terminal. A port corresponding to the interfering signal may be determined by indicating the second resource block group, so that the terminal does not need to perform channel detection on all ports on all first resource block groups. This reduces complexity of a process of processing the interfering signal.

In a possible implementation, the second resource block group is a resource block group on which no strong interfering signal exists, or a resource block group on which no signal corresponding to a jointly scheduled potential terminal exists.

The second resource block group on which no strong interfering signal exists is indicated, so that the network device does not need to indicate, for a plurality of times, one or more DMRS ports associated with the interfering signal on each resource block group, to avoid redundant signaling overheads.

In a possible implementation, the processing the downlink signal based on the second indication information includes: determining a third resource block group other than the second resource block group in the at least one first resource block group based on the second indication information; demodulating, based on a first demodulation reference signal DMRS port associated with the downlink signal and a second DMRS port associated with an interfering signal corresponding to the downlink signal, a downlink signal carried on the third resource block group; and demodulating, based on the first DMRS port associated with the downlink signal, a downlink signal carried on the second resource block group.

In a possible implementation, the second resource block group is a resource block group on which a strong interfering signal exists, or a resource block group on which a signal corresponding to a jointly scheduled potential terminal exists.

The second resource block group on which the strong interfering signal exists is indicated, so that the network device does not need to indicate, for a plurality of times, one or more DMRS ports associated with the interfering signal on each resource block group, to avoid redundant signaling overheads.

In a possible implementation, the processing the downlink signal based on the second indication information includes: determining, based on the second resource block group indicated by the second indication information, a third DMRS port associated with an interfering signal corresponding to the downlink signal; and demodulating, based on a first DMRS port associated with the downlink signal and the third DMRS port, the downlink signal carried on the first resource block group.

In a possible implementation, the first indication information and the second indication information are carried in same downlink control information (DCI).

According to a second aspect, an embodiment of this application provides a signal processing method. The method includes: A network device sends first indication information and second indication information, where the first indication information indicates at least one first resource block group, the second indication information indicates a second resource block group, and the second resource block group belongs to the at least one first resource block group; and the network device sends a downlink signal on at least one resource block group.

In a possible implementation, the second resource block group is a resource block group on which no strong interfering signal exists, or a resource block group on which no signal corresponding to a jointly scheduled potential terminal exists.

In a possible implementation, the second resource block group is a resource block group on which a strong interfering signal exists, or a resource block group on which a signal corresponding to a jointly scheduled potential terminal exists.

In a possible implementation, the network device sends the first indication information and the second indication information by using same DCI.

In a possible implementation, the method further includes: The network device sends the first indication information and the second indication information when a quantity of first CDM groups is less than a quantity of second CDM groups, where the first CDM group is a CDM group including one or more first DMRS ports, and the second CDM group is a CDM group that is configured by the network device and that does not carry data.

According to a third aspect, an embodiment of this application provides a communication apparatus. The apparatus includes:

a receiving module, configured to receive first indication information and second indication information, where the first indication information indicates at least one first resource block group, the second indication information indicates a second resource block group, and the second resource block group belongs to the at least one first resource block group, where the receiving module is further configured to receive a downlink signal on the at least one first resource block group; and a processing module, configured to process the downlink signal based on the second indication information.

In a possible implementation, the second resource block group is a resource block group on which no strong interfering signal exists, or a resource block group on which no signal corresponding to a jointly scheduled potential terminal exists.

In a possible implementation, the processing module is configured to:

determine a third resource block group other than the second resource block group in the at least one first resource block group based on the second indication information;

demodulate, based on a first demodulation reference signal DMRS port associated with the downlink signal and a second DMRS port associated with an interfering signal corresponding to the downlink signal, a downlink signal carried on the third resource block group; and demodulate, based on the first DMRS port associated with the downlink signal, a downlink signal carried on the second resource block group.

In a possible implementation, the second resource block group is a resource block group on which a strong interfering signal exists, or a resource block group on which a signal corresponding to a jointly scheduled potential terminal exists.

In a possible implementation, the processing module is configured to:

determine, based on the second resource block group indicated by the second indication information, a third DMRS port associated with an interfering signal corresponding to the downlink signal; and demodulate, based on a first DMRS port associated with the downlink signal and the third DMRS port, the downlink signal carried on the first resource block group.

In a possible implementation, the first indication information and the second indication information are carried in same downlink control information DCI.

According to a fourth aspect, an embodiment of this application provides a communication apparatus. The apparatus includes:

a sending module, configured to send first indication information and second indication information, where the first indication information indicates at least one first resource block group, the second indication information indicates a second resource block group, and the second resource block group belongs to the at least one first resource block group, where the sending module is further configured to send a downlink signal on the at least one first resource block group.

In a possible implementation, the second resource block group is a resource block group on which no strong interfering signal exists, or a resource block group on which no signal corresponding to a jointly scheduled potential terminal exists.

In a possible implementation, the second resource block group is a resource block group on which a strong interfering signal exists, or a resource block group on which a signal corresponding to a jointly scheduled potential terminal exists.

In a possible implementation, the sending module sends the first indication information and the second indication information by using same DCI.

In a possible implementation, the sending module is further configured to: a network device sends the first indication information and the second indication information when a quantity of first CDM groups is less than a quantity of second CDM groups, where the first CDM group is a CDM group including one or more first DMRS ports, and the second CDM group is a CDM group that is configured by the network device and that does not carry data.

According to a fifth aspect, an embodiment of this application provides an apparatus. The apparatus includes a communication interface and a processor. The communication interface is used by the apparatus to communicate with another device, for example, to send and receive data or a signal. For example, the communication interface may be a transceiver, a circuit, a bus, a module, or a communication interface of another type, and the another device may be a network device. The processor is configured to invoke a group of programs, instructions, or data to perform the method described in the first aspect. The apparatus may further include a memory, configured to store the program, the instructions, or the data invoked by the processor. The memory is coupled to the processor, and the processor may implement the method described in the first aspect when executing the instructions or the data stored in the memory.

According to a sixth aspect, an embodiment of this application provides an apparatus. The apparatus includes a communication interface and a processor. The communication interface is used by the apparatus to communicate with another device, for example, to send and receive data or a signal. For example, the communication interface may be a transceiver, a circuit, a bus, a module, or a communication interface of another type, and the another device may be a terminal. The processor is configured to invoke a group of programs, instructions, or data to perform the method described in the second aspect. The apparatus may further include a memory, configured to store the program, the instructions, or the data invoked by the processor. The memory is coupled to the processor, and the processor may implement the method described in the second aspect when executing the instructions or the data stored in the memory.

According to a seventh aspect, an embodiment of this application further provides a communication apparatus. The communication apparatus includes a processor, a transceiver, a memory, and computer-executable instructions that are stored in the memory and that can be run on the processor. When the computer-executable instructions are run, the communication apparatus is enabled to perform the method in any one of the first aspect or the possible implementations of the first aspect.

According to an eighth aspect, an embodiment of this application further provides a communication apparatus. The communication apparatus includes a processor, a transceiver, a memory, and computer-executable instructions that are stored in the memory and that can be run on the processor. When the computer-executable instructions are run, the communication apparatus is enabled to perform the method in any one of the second aspect or the possible implementations of the second aspect.

According to a ninth aspect, an embodiment of this application further provides a computer-readable storage medium. The computer storage medium stores computer-readable instructions, and when the computer-readable instructions are run on a computer, the computer is enabled to perform the method in any one of the first aspect or the possible implementations of the first aspect.

According to a tenth aspect, an embodiment of this application further provides a computer-readable storage medium, including instructions. When the instructions are run on a computer, the computer is enabled to perform the method in any one of the second aspect or the possible implementations of the second aspect.

According to an eleventh aspect, an embodiment of this application provides a chip system. The chip system includes a processor, and may further include a memory, configured to implement the method in any one of the first aspect or the possible implementations of the first aspect. The chip system may include a chip, or may include a chip and another discrete component.

Optionally, the chip system further includes a transceiver.

According to a twelfth aspect, an embodiment of this application provides a chip system. The chip system includes a processor, and may further include a memory, configured to implement the method in any one of the second aspect or the possible implementations of the second aspect. The chip system may include a chip, or may include a chip and another discrete component.

Optionally, the chip system further includes a transceiver.

According to a thirteenth aspect, an embodiment of this application further provides a computer program product, including instructions. When the instructions are run on a computer, the computer is enabled to perform the method in any one of the first aspect or the possible implementations of the first aspect, or perform the method in any one of the second aspect or the possible implementations of the second aspect.

According to a fourteenth aspect, an embodiment of this application provides a system. The system includes the apparatus provided in the third aspect or the fifth aspect and the apparatus provided in the fourth aspect or the sixth aspect.

BRIEF DESCRIPTION OF DRAWINGS

FIG. 3A is a flowchart of a signal processing method according to an embodiment of this application;

FIG. 3B is a schematic diagram of indication information according to an embodiment of this application;

FIG. 3C is a schematic diagram of resource block group assignment according to an embodiment of this application;

DESCRIPTION OF EMBODIMENTS

Figure 1:
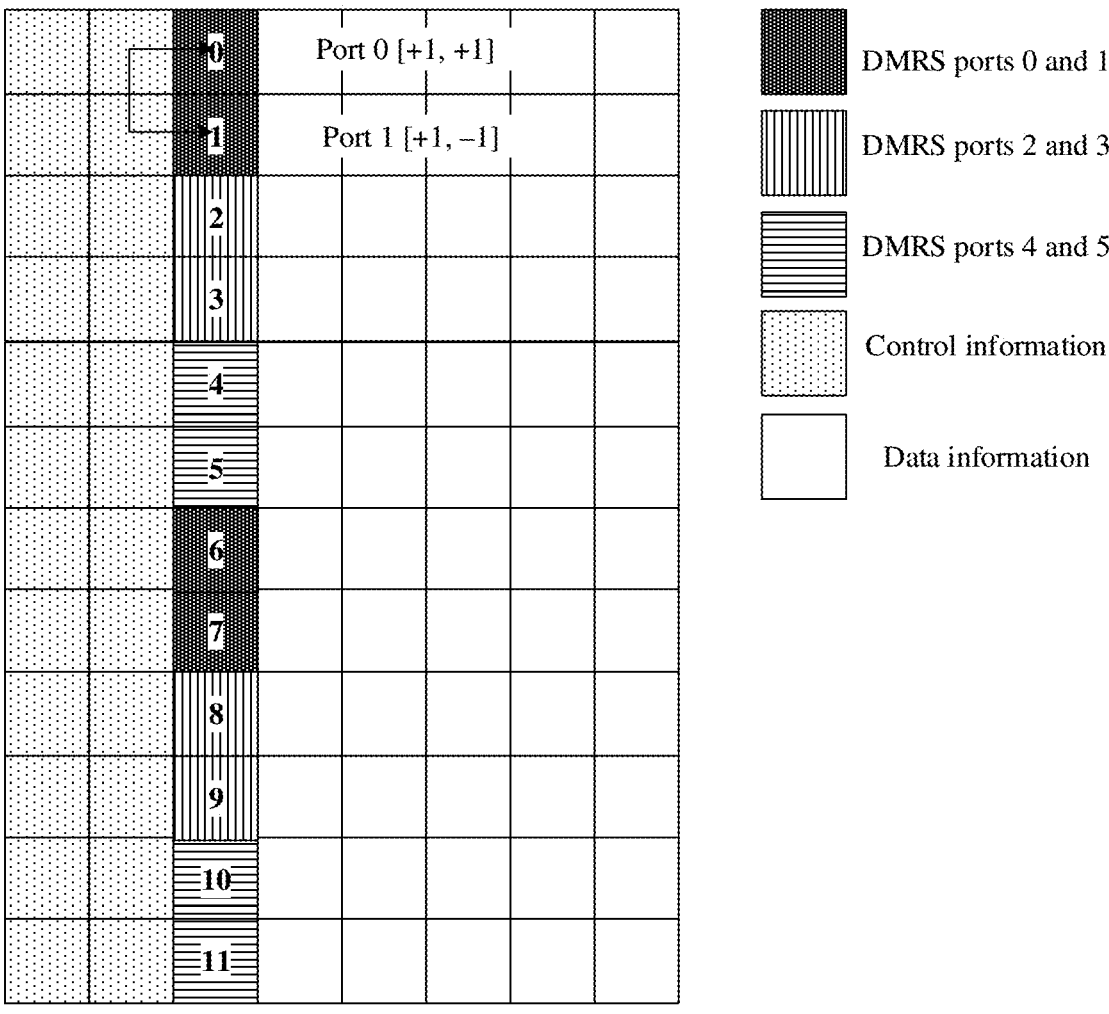
FIG. 1 is a schematic diagram of a DMRS pattern according to an embodiment of this application.

The following further describes the technical solutions provided in this application with reference to the accompanying drawings and embodiments. It should be understood that a system structure and a service scenario that are provided in embodiments of this application are mainly used to explain some possible implementations of the technical solutions of this application, and should not be construed as a unique limitation on the technical solutions of this application. A person of ordinary skill in the art may know that, as a system evolves and an updated service scenario emerges, the technical solutions provided in this application are still applicable to same or similar technical problems.

It should be understood that the technical solutions provided in embodiments of this application include a signal processing method in wireless communication. Because problem-resolving principles of the technical solutions are the same or similar, in the following descriptions of example embodiments, some repeated parts may not be described, but it should be considered that the embodiments are mutually referenced and may be combined with each other.

Terms related to embodiments of this application are first explained.

In a wireless communication system, devices may be classified into devices that provide wireless network services and devices that use wireless network services. The devices that provide the wireless network services refer to devices that form a wireless communication network, and may be referred to as a network device (network equipment) or a network element for short.

The network device may be a base station or an access point, or may be a device that is in an access network and that communicates with a wireless terminal over an air interface through one or more sectors. The base station may be configured to mutually convert a received over-the-air frame and an IP packet and serve as a router between the wireless terminal and a rest part of the access network, where the rest part of the access network may include an internet protocol (IP) network. The base station may further coordinate attribute management of the air interface. For example, the base station may be a base transceiver station (BTS) in a global system for mobile communications (GSM) or a code division multiple access (, CDMA) system, a NodeB (NB) in a wideband code division multiple access (WCDMA) system, an evolved NodeB (evolved NodeB, eNB or eNodeB) in a long term evolution (LTE) system, a relay station or an access point, a gNodeB (gNB) in a 5G network, an integrated access and backhaul (IAB) node, or the like. Base stations may be classified into a macro base station or a micro base station based on different physical forms or transmit powers of the base stations. The micro base station is also sometimes referred to as a small base station or a small cell. This is not limited herein.

Terminal device: The terminal device includes a device that provides a user with voice and/or data connectivity, for example, may include a handheld device with a wireless connection function, or a processing device connected to a wireless modem. The terminal device may communicate with a core network via a radio access network (RAN), and exchange a voice and/or data with the RAN. The terminal device may include user equipment (UE), a wireless terminal device, a mobile terminal device, a subscriber unit, a subscriber station, a mobile station, a mobile, a remote station, an access point (AP), a remote terminal device (remote terminal), an access terminal device (access terminal), a user terminal device (user terminal), a user agent), a user device, or the like. For example, the terminal device may include a mobile phone (which is also referred to as a "cellular" phone), a computer having a mobile terminal device, a portable, pocket-sized, handheld, computer built-in, or vehicle-mounted mobile apparatus, and a smart wearable device. For example, the terminal device may be a device such as a personal communications service ( ) phone, a cordless phone, a session initiation protocol (SIP) phone, a wireless local loop (WLL) station, a personal digital assistant (PDA), a smartwatch, a smart helmet, smart glasses, or a smart band. The terminal device further includes a limited device, for example, a device having low power consumption, a device having a limited storage capability, or a device having a limited computing capability. For example, the terminal device includes an information sensing device, for example, a barcode, radio frequency identification (RFID), a sensor, a global positioning system (GPS), or a laser scanner.

Subcarrier: In an orthogonal frequency division multiplexing (OFDM) system, a frequency domain resource is divided into several sub-resources, and each sub-resource in frequency domain may be referred to as a subcarrier. The subcarrier may also be understood as a smallest granularity of the frequency domain resource.

Subcarrier spacing: The subcarrier spacing is an interval between center locations or peak locations of two adjacent subcarriers in frequency domain in the OFDM system. For example, a subcarrier spacing in the LTE system is 15 kHz, and a subcarrier spacing in a 5G NR system may be 15 kHz, 30 kHz, 60 kHz, or 120 kHz.

OFDM symbol: The OFDM symbol is a smallest time unit in time domain in the OFDM system.

Time-frequency resource element: The time-frequency resource element is a smallest resource granularity in the OFDM system, is an OFDM symbol in time domain and a subcarrier in frequency domain, and may be referred to as a resource element (RE).

Spatial layer: In an existing wireless communication system, a base station end is equipped with a plurality of antennas to implement spatial multiplexing transmission by using a multiple-input multiple-output (MIMO) technology. To be specific, a plurality of unrelated data streams are transmitted on a same time-frequency resource, each unrelated data stream is transmitted on an independent spatial layer, and each spatial layer is mapped to a different antenna port for sending.

Time-frequency resource: The time-frequency resource includes M OFDM symbols in time domain, and includes N subcarriers in frequency domain.

Antenna port: In the 5G NR system, the antenna port is a logical port used for transmission, and one antenna port includes a plurality of physical antennas. From a perspective of a receiving end, each antenna port corresponds to one independent radio channel.

DMRS: The demodulation reference signal (DMRS) is a reference signal used to recover a received signal. The DMRS is a signal known by the receiving end. The receiving end may determine, based on the received signal and the known DMRS signal, a fading characteristic of a radio channel, namely, a channel coefficient of the radio channel, to recover the received signal. In the 5G NR system, considering that channel coefficients from different antenna ports to a terminal are different, to enable the receiving end to obtain information transmitted on a plurality of spatial layers, a channel coefficient between each antenna port and the terminal is to be estimated. Therefore, a different DMRS is configured for each antenna port, and DMRSs corresponding to different antenna ports may be multiplexed in manners such as time division, frequency division, and code division. Currently, the 5G NR system supports a maximum of 12 DMRS ports.

CDM group: Code division multiplexing (CDM) group. Different DMRSs are distinguished on a same RE in a code division multiplexing manner. Therefore, a code division multiplexing group is formed by using a same time-frequency resource DMRS through code division multiplexing. FIG. 1 is a schematic diagram of a type-2 single-symbol DMRS pattern specified in a 5G NR system. As shown in FIG. 1, a horizontal direction represents a time domain, a vertical direction represents frequency domain, and each small block represents an RE. A resource block (RB)

includes 12 consecutive carriers in frequency domain. In the type-2 single-symbol DMRS pattern specified in the 5G NR system, a maximum of six DMRSs can be transmitted on 12 consecutive REs in frequency domain, where the REs are numbered from 0 to 11. A DMRS 0 and a DMRS 1 belong to a CDM group 0, a DMRS 2 and a DMRS 3 belong to a CDM group 1, and a DMRS 4 and a DMRS 5 belong to a CDM group 2. The CDM group 0 uses the REs 0, 1, 6, and 7, the CDM group 1 uses the REs 2, 3, 8, and 9, and the CDM group 2 uses the REs 4, 5, 10, and 11. Code division multiplexing is performed on DMRSs in a same CDM group on a same RE. For example, a codeword of the DMRS 0 transmitted on the REs 0 and 1 is [+1, +1], a codeword of the DMRS 1 transmitted on the REs 0 and 1 is [−1, −1], and the codewords of the DMRS 0 and the DMRS 1 are orthogonal. In FIG. 1, a total quantity of DMRS ports is 6, and a quantity of CDM groups is 3.

To better understand the technical solutions provided in embodiments of this application, the following first describes a technical background and an application scenario of embodiments of this application.

Figure 2A:
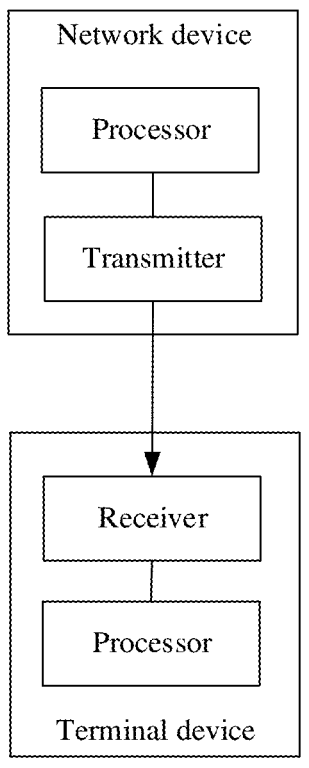
FIG. 2A is a schematic diagram of a connection between a network device and a terminal according to an embodiment of this application.

FIG. 2A is a schematic diagram of a connection between a network device and a terminal according to an embodiment of this application. As shown in FIG. 2A, the network device is configured to send a downlink signal to the terminal, and includes a transmitter and a processor. The processor is configured to convert original data into a radio frequency signal, and the transmitter is configured to send the radio frequency signal to the terminal. The terminal is configured to receive the downlink signal sent by the network device, and includes a receiver and a processor. The receiver is configured to receive the radio frequency signal sent by the network device, and the processor is configured to convert the radio frequency signal into the original data.

Figure 2B:
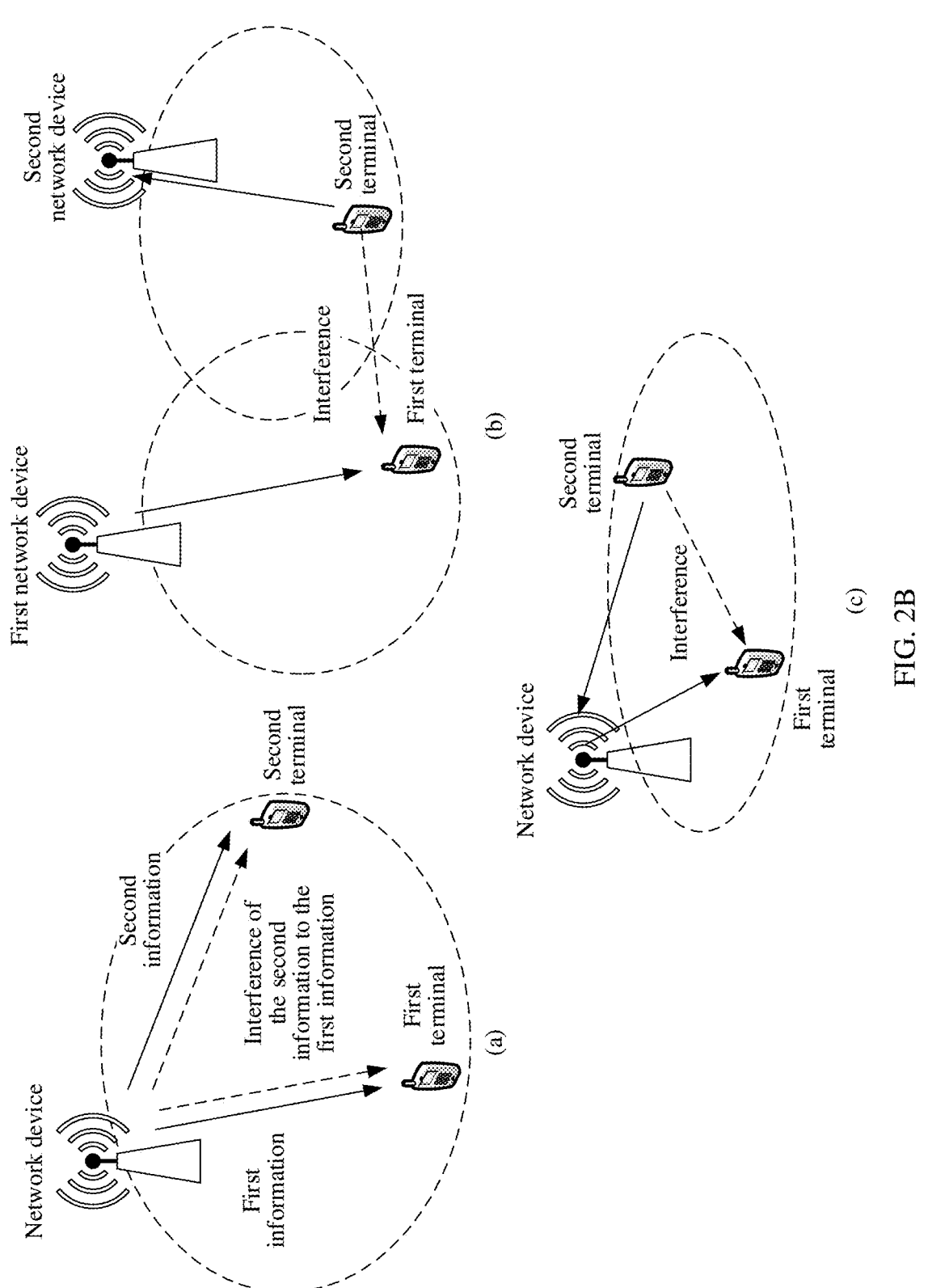
FIG. 2B is a schematic diagram of a scenario in which a terminal receives an interfering signal according to an embodiment of this application.

In a process of communication between the network device and the terminal, the terminal may receive an interfering signal because a same network device can simultaneously send signals to a plurality of terminals, a plurality of adjacent network devices send signals to different terminals, or the like. For a scenario in which the terminal receives the interfering signal, refer to FIG. 2B. FIG. 2B is a schematic diagram of a scenario in which a terminal receives an interfering signal according to an embodiment of this application. As shown in (a) in FIG. 2B, a network device sends two pieces of different information to two terminals on a same time-frequency resource. For example, the network device sends first information to a first terminal, and sends second information to a second terminal. Because the network device sends the first information and the second information on the same time-frequency resource, when receiving the required first information, the first terminal also receives the second information. In this case, the second information causes interference to the first terminal to receive the first information. Therefore, the second information is also considered as interfering information.

Alternatively, as shown in (b) in FIG. 2B, a first network device sends a downlink signal to a first terminal, and another second network device in a neighboring cell receives an uplink signal from a second terminal. In this way, when receiving the downlink signal, the first terminal also receives the uplink signal sent by the second terminal. In this case, the uplink signal is considered as an interfering signal of the first terminal.

Alternatively, as shown in (c) in FIG. 2B, a network device is a full-duplex network device, the network device may simultaneously perform sending and receiving on a same frequency domain resource. When the network device sends a downlink signal to a first terminal, if a second terminal is sending an uplink signal to the network device, when receiving the downlink signal, the first terminal receives the uplink signal sent by the second terminal. The uplink signal is considered as an interfering signal of the first terminal.

The network device may perform blind detection on all DMRS ports, and perform detection or estimation on DMRSs corresponding to all the DMRS ports, to obtain channel coefficients of all the DMRS ports, where the channel coefficients include a channel coefficient of a DMRS port corresponding to the interfering signal, and may suppress the interfering signal based on the channel coefficients of all the DMRS ports.

In the foregoing process, when the terminal performs blind detection on all other DMRS ports, a current 5G NR system supports a maximum of 12 DMRS ports. As a result, a quantity of times that the terminal performs blind detection on the DMRS ports is large, and complexity is high. Especially, the network device may group all resource blocks into several resource block groups, and each resource block group includes at least one resource block. Because signals mapped to the resource block groups are different, when the terminal is to perform interference suppression on each resource block group, the terminal performs blind detection on all the DMRS ports on each resource block group. This greatly increases the quantity of times that the terminal performs blind detection on the DMRS ports, and the complexity is extremely high.

The following describes the technical solutions in embodiments of this application with reference to the accompanying drawings in embodiments of this application. Embodiments of this application provide a signal processing method. FIG. 3A is a flowchart of a signal processing method according to an embodiment of this application. As shown in FIG. 3A, the method includes the following steps.

301: A network device sends first indication information and second indication information, where the first indication information indicates at least one first resource block group, the second indication information indicates a second resource block group, and the second resource block group belongs to the at least one first resource block group.

302: A terminal receives the first indication information and the second indication information.

303: The network device sends a downlink signal on the at least one first resource block group.

304: The terminal receives the downlink signal on the at least one first resource block group, and processes the downlink signal based on the second indication information.

In this embodiment of this application, there may be a plurality of terminals communicating with a same network device or different network devices in a communication system. Therefore, for differentiation, a terminal that performs interference suppression is referred to as a target terminal.

After receiving a downlink signal including an interfering signal, the target terminal suppresses the interfering signal to obtain a more accurate wanted signal through demodulation. The interfering signal suppression method mentioned in the foregoing content has problems of high calculation complexity and high signaling overheads. According to the method used in this embodiment of this application, the network device first groups resource blocks on which the network device and the target terminal perform communication mapping, and obtain one or more first resource block groups. Each first resource block group includes one or more resource blocks. Then, the network device determines the second resource block group in the first resource block group, where the second resource block group is a part of resource block group in the first resource block group. The part of resource block group may have a special connotation, for example, is a resource block group that includes a strong interfering signal, or is a resource block group that does not include the strong interfering signal. Further, the network device indicates the first resource block group to the terminal by using the first indication information, and the network device indicates the second resource block group to the terminal by using the second indication information. After determining the first resource block group, the terminal may receive, on the first resource block group, the downlink signal sent by the network device. Because the network device further indicates the second resource block group, and the second resource block group may be the part of resource block group that has the special connotation in the first resource block group, the terminal may further process the downlink signal based on the second resource block group, and further suppress the interfering signal, to obtain, through demodulation, a downlink signal that is sent by the network device to the target terminal and that does not include the interfering signal.

It can be learned that in this embodiment of this application, the network device indicates the first resource block group and the second resource block group to the terminal. Because the first resource block group is a resource block group corresponding to the downlink signal sent by the network device to the terminal, and the second resource block group is the part of resource block group in the first resource block group, in a signal processing process, a downlink signal on the part of resource block group is processed based on the second resource block group, so that an interfering signal in the downlink signal can be suppressed, thereby avoiding processing of all resource block groups, reducing complexity of interference suppression processing of the terminal, and improving efficiency of interfering signal suppression. In addition, the network device only indicates the first resource block group and the second resource block group to the terminal for a single time, and there is no redundant signaling overheads. In this way, complexity of a process of interference suppression processing is reduced.

The first resource block group is a resource block group that carries a downlink signal to be sent by the network device to the target terminal, and the first resource block group includes one or more resource blocks. Optionally, the downlink signal may be a physical downlink shared channel (PDSCH) or a physical downlink control channel (PDCCH).

That the first indication information indicates the at least one first resource block group may be understood as that the network device groups, into a first resource block group, an RB used to carry the downlink signal to be sent to the target terminal, and indicates the first resource block group to the terminal by using the first indication information. The network device sends the downlink signal on the first resource block group, and the target terminal receives the downlink signal on the first resource block group indicated by the first indication information. First resource block groups may be sequentially obtained through grouping by the network device based on a sequence of RB numbers, or may be obtained through grouping in another manner.

Optionally, the first indication information may be carried in downlink control information (DCI). The first indication information may include some existing DCI fields, or may include a newly added DCI field. Optionally, the first indication information may include a frequency domain resource assignment and a PRB bundling size indicator field in the DCI. For details, refer to FIG. 3B. FIG. 3B is a schematic diagram of indication information according to an embodiment of this application. As shown in FIG. 3B, a bandwidth part indicator (Bandwidth part indicator) field, a frequency domain resource assignment field, a PRB bundling size indicator field, and an antenna port field are some fields in DCI. The first indication information may include the frequency domain resource assignment field and the PRB bundling size indicator field. Then, the target terminal may determine the first resource block group based on the indication information. Further, for a process in which the terminal obtains the first resource block group through grouping based on the first indication information, refer to FIG. 3C. FIG. 3C is a schematic diagram of grouping resource block groups according to an embodiment of this application. As shown in FIG. 3C, it is assumed that in DCI sent by the network device to the target terminal device, a frequency domain resource assignment field indicates eight resource blocks used to carry a downlink signal, where the RBs are numbered from 0 to 7, and a PRB bundling size indicator field indicates that each resource block group includes two resource blocks. The eight resource blocks may be grouped into four resource block groups, where numbers of the resource block groups are respectively resource block groups 0, 1, 2, and 3. The resource block group 0 includes the RB 0 and the RB 1, the resource block group 1 includes the RB 2 and the RB 3, the resource block group 2 includes the RB 4 and the RB 5, and the resource block group 3 includes the RB 6 and the RB 7.

Optionally, the second resource block group is one or more resource block groups in the first resource block group. Alternatively, the second resource block group includes one or more second resource blocks, and the second resource block is included in the first resource block group. In other words, a grouping manner of the second resource block group may be different from a grouping manner of the first resource block group.

The second indication information indicates at least one second resource block group. Optionally, the second indication information is carried in DCI. A manner in which the second indication information indicates the second resource block group includes: The second indication information indicates a number of the second resource block group. The target terminal determines the second resource block group based on a number, of a resource block group, indicated by the second indication information. For example, as shown in FIG. 3C, the second indication information indicates the number of the resource block group 2, and the target terminal determines the resource block group 2 as the second resource block group. Alternatively, the second indication information indicates a time-frequency location of the second resource block group. The target terminal determines the second resource block group based on the time-frequency location indicated by the second indication information. Alternatively, the second indication information indicates a number of a resource block, and the resource block is included in the at least one first resource block group. The target terminal determines the second resource block group based on the number, of the resource block, indicated by the second indication information. For example, as shown in FIG. 3C, the second indication information indicates the numbers of the RB 4 and the RB 5, and the target terminal determines, as the second resource block group, the resource block group including the RB 4 and the RB 5.

Optionally, the second indication information is newly added information. The second indication information may be located after an antenna port field in the DCI. As shown in FIG. 3B, the second indication information is located after the antenna port field in the DCI.

Optionally, a length of the second indication information may be 0 or N bits. The length of the second indication information may be determined by the antenna port field in the DCI. Alternatively, the length of the second indication information may be determined by a quantity, of CDM groups that do not carry data, indicated by the antenna port field in the DCI. In some embodiments, the length of the second indication information is determined by the quantity, of CDM groups that do not carry data, indicated by the antenna port field, and a quantity of CDM groups corresponding to DMRS ports indicated by the antenna port field. An operation of determining the length of the second indication information may include the following steps: determining, based on the antenna port field in the DCI, DMRS ports corresponding to a downlink signal sent to the target terminal; determining, based on the DMRS ports, a quantity of CDM groups corresponding to the DMRS ports; and when the quantity of CDM groups corresponding to the DMRS ports indicated by the antenna port field is not less than the quantity of CDM groups that do not carry data, determining that the length of the second indication information is 0 bits; or when the quantity of CDM groups corresponding to the DMRS ports indicated by the antenna port field is less than the quantity of CDM groups that do not carry data, determining that the length of the second indication information is N bits. It may be understood that when the quantity of CDM groups corresponding to the DMRS ports indicated by the antenna port field is less than the quantity of CDM groups that do not carry data, it indicates that the CDM group that does not carry data includes a DMRS port of another terminal user, and the another terminal user transmits a signal by using a same time-frequency resource. In other words, the target terminal is interfered with by the another terminal user. The network device sends the second indication information, in other words, the length of the second indication information is N bits. When the quantity of CDM groups corresponding to the DMRS ports indicated by the antenna port field is not less than the quantity of CDM groups that do not carry data, it indicates that the CDM group that cannot carry data does not include a DMRS port of another terminal, and no other terminal user uses a same time-frequency resource for transmission. In other words, the target terminal is not interfered with by the another terminal user. The network device does not send the second indication information, in other words, the length of the second indication information is 0 bits.

For example, the network device configures 12 DMRS ports for the target terminal, where the DMRS ports are numbered from 0 to 11, and are grouped into three CDM groups. Numbers of the CDM groups are respectively CDM groups 0, 1, and 2. The DMRS ports 0, 1, 2, and 3 belong to the CDM group 0, the DMRS ports 4, 5, 6, and 7 belong to the CDM group 1, and the DMRS ports 8, 9, 10, and 11 belong to the CDM group 2. When the quantity, of CDM groups that do not carry data, indicated by the antenna port field in the DCI is 1, and an indicated DMRS port corresponding to the wanted signal received by the target terminal from the network device is the DMRS port 0, it is first determined that the DMRS port 0 belongs to the CDM group 0. In this case, a determined quantity of CDM groups is equal to the quantity of CDM groups that do not carry data, and the CDM group that does not carry data is the CDM group 0 corresponding to the DMRS port 0 used by the terminal device to transmit the wanted signal. An additional CDM group that does not carry data and that is used to carry a wanted signal of another terminal is not indicated, and it may be considered that there is no other interfering terminal. In this case, the network device may not send the second indication information, or the field length of the second indication information is 0 bits. When the quantity, of CDM groups that do not carry data, indicated by the antenna port field in the DCI is 2, and an indicated DMRS port corresponding to the wanted signal received by the target terminal from the network device is the DMRS port 0, it is first determined that the DMRS port 0 belongs to the CDM group 0. In this case, a determined quantity of CDM groups is less than the quantity of CDM groups that do not carry data, and the CDM groups that do not carry data may be the CDM groups 0 and 1 or the CDM groups 0 and 2. It may be considered that there is another interfering terminal that transmits a signal by using a same time-frequency resource, where a DMRS port corresponding to the signal belongs to the CDM group 1 or the CDM group 2, and the target terminal device processes an interfering signal of the another interfering terminal. In other words, the network device sends the second indication information, or the field length of the second indication information is N bits.

Further, the manner in which the second indication information indicates the second resource block group may be determined based on a type of the second resource block group.

Optionally, the type of the second resource block group includes the following optional cases: (1) The second resource block group is a resource block group on which no strong interfering signal exists, or a resource block group on which no signal corresponding to a jointly scheduled potential terminal exists. (2) The second resource block group is a resource block group on which a strong interfering signal exists, or a resource block group on which a signal corresponding to a jointly scheduled potential terminal exists. (3) The second resource block group includes at least one third resource block group and at least one fourth resource block group, where the third resource block group is a resource block group on which a strong interfering signal exists or a resource block group on which a signal corresponding to a jointly scheduled potential terminal exists, and the fourth resource block group is a resource block group on which no relatively strong interfering signal exists or a resource block group on which no signal corresponding to a jointly scheduled potential terminal exists. A quantity of resource block groups included in the third resource block group and the fourth resource block group is less than a quantity of resource block groups in the first resource block group.

In the optional case (1), the second resource block group is a resource block group on which no strong interfering signal exists, or a resource block group on which no signal corresponding to the jointly scheduled potential terminal exists.

Optionally, the network device determines at least one second resource block group. A quantity of DMRS ports corresponding to potential interference on the second resource block group is less than a quantity of DMRS ports corresponding to potential interference on the first resource block group except the second resource block group. Alternatively, a quantity of DMRS ports corresponding to potential interference greater than a preset interference threshold on the second resource block group is zero, the preset interference threshold may be 0, and the second resource block group is included in the first resource block group. It may be understood herein that the second resource block group determined by the network device is a resource block group on which no strong interfering signal exists, or a resource block group on which no signal corresponding to the jointly scheduled potential terminal exists. That the second resource block group does not have the strong interfering signal includes two meanings: There are few interfering signals on the second resource block group, or there is no interfering signal on the second resource block group. If there are few interfering signals on the second resource block group, it means that a quantity of interfering DMRS ports (DMRS ports corresponding to the interfering signals) corresponding to the signals on the second resource block group is less than a quantity of interfering DMRS ports on another resource block group, that is, the interfering DMRS ports corresponding to the signals on the second resource block group are a subset of an interfering DMRS port set on the another resource block group. If there is no interfering signal on the second resource block group, it means that a quantity of interfering DMRS ports corresponding to the signals on the second resource block group is 0. For example, the network device assigns eight RBs to carry a downlink signal sent to the target terminal, where the RBs are numbered from 0 to 7. The network device determines that the eight RBs are grouped into four first resource block groups, where the first resource block groups are numbered from 0 to 3. The first resource block group 0 includes the RBs 0 and 1, the first resource block group 1 includes the RBs 2 and 3, the first resource block group 2 includes the RBs 4 and 5, and the first resource block group 3 includes the RBs 6 and 7. A DMRS port associated with the downlink signal sent by the network device to the terminal user is a DMRS port 0. In addition, the network device determines that the RBs 0 to 5 carry a downlink signal to be sent to a second terminal, and a DMRS port associated with the downlink signal sent by the network device to the second terminal is a DMRS port 5. In this case, the network device may determine that a potential interfering signal of the second terminal exists on the first resource block groups 0 to 2, a quantity of DMRS ports corresponding to potential interference is 1, no potential interfering signal of the second terminal exists on the first resource block group 3, a quantity of DMRS ports corresponding to potential interference on the first resource block group 3 is 0, and a quantity of DMRS ports associated with potential interference greater than 0 on the first resource block group 3 is 0. Therefore, the network device determines that the second resource block group is the first resource block group 3.

Optionally, the second indication information indicates the second resource block group on which no strong interfering signal exists in the first resource block group, or the second resource block group on which no signal corresponding to the jointly scheduled potential terminal exists. For example, the network device sends a downlink signal, including a first signal, a second signal, and a third signal, on the at least one first resource block group (or a first resource block set that is not grouped), where the first signal is a signal sent by the network device to the target terminal, and the second signal and the third signal are signals, namely, interfering signals of the target terminal, sent by the network device to another terminal. The first signal corresponds to a DMRS port 0, the second signal corresponds to a DMRS port 4, and the third signal corresponds to a DMRS port 5. The network device configures, for the target terminal by using downlink DCI, three first resource block groups that are respectively first resource block groups 0 to 2 to transmit the first signal. The network device configures, for another terminal device, the first resource block groups 0 and 1 to transmit the second signal and the first resource block group 1 to transmit the third signal. Only the first signal is mapped to the first resource block group 2, the second signal or the third signal is not mapped, and there is no strong interfering signal. In other words, a quantity of interfering DMRS ports corresponding to the first resource block group 2 is 0. In this case, the second resource block group indicated by the second indication information may be the first resource block group 2.

In this embodiment of this application, a possible indication manner of the second indication information is: The second indication information indicates at least one second resource block group by using a bitmap. A length of the bitmap is N bits, and a value of N is equal to a quantity of resource block groups included in one or more first resource block groups, or a value of N is a quantity of resource blocks included in one or more first resource block groups. If a bit in the bitmap is set to 1, it indicates that a resource block group corresponding to the bit is the second resource block group, or it indicates that a resource block corresponding to the bit is included in the second resource block group. Otherwise, it indicates that a resource block group corresponding to the bit is not the second resource block group, or it indicates that a resource block group corresponding to the bit is not included in the second resource block group.

For example, for a case in which four first resource block groups are included, where the resource block groups are numbered from 0 to 3, the field length corresponding to the second indication information is 4 bits. Details are shown in the following Table 1.

TABLE 1

| Bitmap configuration of the second indication information | Indicates a number of the second resource block group |
|---|---|
| [1000] | Resource block group 0 |
| [0100] | Resource block group 1 |
| [0010] | Resource block group 2 |
| [0001] | Resource block group 3 |
| [1100] | Resource block groups 0 and 1 |
| [1010] | Resource block groups 0 and 2 |
| [1001] | Resource block groups 0 and 3 |
| [0110] | Resource block groups 1 and 2 |
| [0101] | Resource block groups 1 and 3 |
| [0011] | Resource block groups 2 and 3 |

The value [1000] of the second indication information indicates the resource block group 0, the value [0100] indicates the resource block group 1, the value [0010] indicates the resource block group 2, the value [0001] indicates the resource block group 3, the value [1100] indicates the resource block group 0 and the resource block group 1, the value [1010] indicates the resource block group 0 and the resource block group 2, the value [1001] indicates the resource block group 0 and the resource block group 3, the value [0110] indicates the resource block group 1 and the resource block group 2, the value [0101] indicates the resource block group 1 and the resource block group 3, and the value [0011] indicates the resource block group 2 and the resource block group 3.

Another optional indication manner of the second indication information is: The second indication information indicates at least one second resource block group by using an index. The second indication information is an index value, and the index value corresponds to one or more numbers of one or more first resource block groups, or the index value corresponds to one or more numbers of one or more resource blocks. The field length N of the second indication information is determined by K states of a second resource block group combination, and may indicate one of the K states.

For example, for a case in which the at least one first resource block group includes four first resource block groups, where the resource block groups are numbered from 0 to 3, when the at least one second resource block group is one second resource block group, the second resource block group combination has K=(1, 4) states in total. (P, Q) represents a combination for selecting P from Q, for example, selecting P second resource block groups from Q first resource block groups. The following representation has the same meaning, and details are not described again. In this case, the field length corresponding to the second indication information is $N=\lceil \log 2(1,4) \rceil =2$ bits. Details are shown in the following Table 2.

TABLE 2

| Configuration of the second indication information | Indicates a number of the second resource block group |
|---|---|
| [00] | Resource block group 0 |
| [01] | Resource block group 1 |
| [10] | Resource block group 2 |
| [11] | Resource block group 3 |

The value [00] of the second indication information indicates the resource block group 0, the value [01] indicates the resource block group 1, the value [10] indicates the resource block group 2, and the value [11] indicates the resource block group 3.

For a case in which the at least one first resource block group includes four first resource block groups, where the first resource block groups are numbered from 0 to 3, when the at least one second resource block group is at least two second resource block groups, the second resource block group combination has K=(1, 4)+(2, 4) states in total, where a field length corresponding to the second indication information is $N=\lceil \log 2[(1,4)+(2,4)] \rceil =4$ bits. Details are shown in the following Table 3.

TABLE 3

| Configuration of the second indication information | Indicates a number of the second resource block group |
|---|---|
| [0000] | Resource block group 0 |
| [0001] | Resource block group 1 |
| [0010] | Resource block group 2 |
| [0011] | Resource block group 3 |
| [0100] | Resource block groups 0 and 1 |
| [0101] | Resource block groups 0 and 2 |
| [0110] | Resource block groups 0 and 3 |
| [0111] | Resource block groups 1 and 2 |
| [1000] | Resource block groups 1 and 3 |
| [1001] | Resource block groups 2 and 3 |

The value [0000] of the second indication information indicates the resource block group 0, the value [0001] indicates the resource block group 1, the value [0010] indicates the resource block group 2, the value [0011] indicates the resource block group 3, the value [0100] indicates the resource block group 0 and the resource block group 1, the value [0101] indicates the resource block group 0 and the resource block group 2, the value [0110] indicates the resource block group 0 and the resource block group 3, the value [0111] indicates the resource block group 1 and the resource block group 2, the value [1000] indicates the resource block group 1 and the resource block group 3, and the value [1001] indicates the resource block group 2 and the resource block group 3.

The target terminal receives the first indication information and the second indication information. The second resource block group is determined based on the first indication information and the second indication information, where the second resource block group is a resource block group on which no strong interfering signal exists, or a resource block group on which no signal corresponding to the jointly scheduled potential terminal exists. Further, the target terminal processes a downlink signal based on the indicated second resource block group. The downlink signal herein is a downlink signal carried on the first resource block group, namely, a downlink signal sent by the network device to the target terminal.

Optionally, that the downlink signal is processed based on the second indication information may include the following steps.

3011: Determine a third resource block group other than the second resource block group in the at least one first resource block group based on the second indication information.

The third resource block group is a resource block group other than the second resource block group in the first resource block group. In other words, the third resource block group is a complementary set of the second resource block group in the first resource block group. For example, first resource block groups are first resource block groups 0 to 2, a second resource block group is the first resource block group 0, and third resource block groups are the first resource block group 1 and the first resource block group 2. It should be understood that the second resource block group is a resource block group on which no strong interfering signal exists, or is a resource block group on which no signal corresponding to the jointly scheduled potential terminal exists. In this case, the third resource block group is a resource block group on which the strong interfering signal exists, or is a resource block group on which the signal corresponding to the jointly scheduled potential terminal exists.

3012: Demodulate, based on a first demodulation reference signal DMRS port associated with the downlink signal and a second DMRS port associated with an interfering signal corresponding to the downlink signal, a downlink signal carried on the third resource block group.

This Step Includes:

The terminal device detects all or some of DMRSs in a DMRS port set on the third resource block group, to determine a second DMRS port, where the second DMRS port is a DMRS port associated with the strong interfering signal. In some embodiments, the terminal detects all or some of DMRSs in the DMRS port set on the third resource block group; the terminal determines a detection result or a channel coefficient of the first DMRS port on the third resource block group, where the first DMRS port is a DMRS port associated with a downlink signal sent by the network device to the target terminal; and the terminal device determines the second DMRS port based on detection results or channel coefficients of all or some of DMRSs in the DMRS port set on the third resource block group. The second DMRS port is a DMRS port, other than the first DMRS port, whose channel coefficient is the largest or greater than a preset threshold.

The terminal device demodulates the downlink signal on the third resource block group based on the channel coefficient of the first DMRS port and the channel coefficient of the second DMRS port. It should be understood that the demodulation process includes interference suppression processing. It should be understood that this step includes: suppressing, based on the channel coefficient of the second DMRS port, an interfering signal in the downlink signal carried on the third resource block group.

For example, the network device determines that the third resource block group corresponds to 12 DMRS ports, where the DMRS ports are numbered from 0 to 11. A DMRS port associated with a downlink signal sent by the network device to the terminal device is the DMRS port 0. The terminal detects DMRSs of the 12 DMRS ports on the third resource block group, and determines a channel coefficient of the DMRS port 0 and channel coefficients of the DMRS ports 1 to 11, where the channel coefficient of the DMRS port 6 is the largest. Therefore, it is determined that the DMRS port 6 is the second DMRS port, namely, the DMRS port corresponding to the strong interfering signal, and the downlink signal carried on the third resource block group is demodulated based on the DMRS ports 0 and 6.

3013: Demodulate, based on the first DMRS port associated with the downlink signal, a downlink signal carried on the second resource block group.

Step 3013 includes the following steps: The terminal device detects the first DMRS port on a second resource block set, and determines the detection result or the channel coefficient of the first DMRS port; and the terminal device demodulates, based on the detection result or the channel coefficient of the first DMRS port, the downlink signal carried on the second resource block group. It should be understood that no interfering signal exists, or potential interference, namely, potential interference that can be ignored by the target terminal, less than a preset threshold exists on the second resource block group. Therefore, the demodulation process does not include performing interference suppression processing.

It can be learned that in this embodiment of this application, because the second resource block group indicated by the second indication information is a part of resource block group that is in the first resource block group and on which no strong interfering signal exists, in a signal processing process, only a DMRS port associated with the downlink signal on the second resource block group and some or all of DMRS ports in a DMRS port set on the third resource block group are to be detected. In this way, a channel coefficient of a DMRS port required for demodulating the downlink signal carried on the first resource block group can be obtained. Compared with a conventional technology in which all DMRS ports in DMRS sets on all first resource block groups that are to be detected, this solution reduces a quantity of detection times and improves efficiency of interfering signal suppression. In addition, the second resource block group on which no strong interfering signal exists is indicated, so that the network device does not need to indicate one or more DMRS ports associated with an interfering signal on each first resource block group, to avoid redundant signaling overheads.

In the optional case (2), the second resource block group is a resource block group on which the strong interfering signal exists, or a resource block group on which the signal corresponding to the jointly scheduled potential terminal exists.

The second resource block group is used by the terminal to determine a DMRS port associated with the strong interfering signal corresponding to the downlink signal, or used by the terminal to determine a DMRS port associated with the signal corresponding to the jointly scheduled terminal corresponding to the downlink signal.

Optionally, the network device determines at least one second resource block group, where a quantity of DMRS ports corresponding to potential interference on the second resource block group is greater than a quantity of DMRS ports corresponding to potential interference on the first resource block group except the second resource block group. Alternatively, a DMRS port set corresponding to potential interference on the first resource block group except the second resource block group is a subset of a DMRS port set corresponding to potential interference on the second resource block group. It should be understood that the second resource block group determined by the network device is a resource block group on which strong interference exists, or a resource block group on which the signal corresponding to the jointly scheduled potential terminal exists, and the second resource block group is a resource block group on which the strong interfering signal exists. This means that a quantity of interfering DMRS ports corresponding to the signal on the second resource block group is greater than a quantity of interfering DMRS ports on another resource block group. Therefore, the network device may determine, as the second resource block group, a resource block group corresponding to a largest quantity of interfering DMRS ports (or a resource block group on which interference is greater than a threshold). For example, the network device assigns eight RBs to carry a downlink signal sent to the target terminal, where the RBs are numbered from 0 to 7. The network device determines that the eight RBs are grouped into four first resource block groups, where the first resource block groups are numbered from 0 to 3. The first resource block group 0 includes the RBs 0 and 1, the first resource block group 1 includes the RBs 2 and 3, the first resource block group 2 includes the RBs 4 and 5, and the first resource block group 3 includes the RBs 6 and 7. A DMRS port associated with the downlink signal sent by the network device to the target terminal is a DMRS port 0. In addition, the network device determines that the RBs 0 to 5 carry a downlink signal to be sent to a second terminal, and a DMRS port associated with the downlink signal sent by the network device to the second terminal is a DMRS port 5. The network device determines that the RBs 0 and 1 carry a downlink signal to be sent to a third terminal, and a DMRS port associated with the downlink signal sent by the network device to the third terminal is a DMRS port 6. The second terminal and the third terminal are terminal devices that cause interference to the target terminal. In this case, the network device may determine that a quantity of DMRS ports corresponding to potential interference existing on the first resource block group 0 is 2, where a DMRS port set corresponding to potential interference includes the DMRS ports 5 and 6, a quantity of DMRS ports corresponding to potential interference existing on first resource block groups 1 and 2 is 1, where a DMRS port set corresponding to potential interference includes the DMRS port 5, and a quantity of DMRS ports corresponding to potential interference existing on the first resource block group 3 is 0, where a DMRS port set corresponding to potential interference is empty. A quantity of DMRS ports associated with an interfering signal on the first resource block group 0 is greater than a quantity of DMRS ports associated with interfering signals on the first resource block groups 1, 2, and 3. The DMRS port sets corresponding to potential interference on the first resource block groups 1, 2, and 3 are subsets of the DMRS port set corresponding to potential interference on the first resource block group 0. Therefore, the network device determines that the second resource block group is the first resource block group 0.

Optionally, the second indication information indicates the second resource block group on which the strong interfering signal exists in the first resource block group, or the second resource block group on which the signal corresponding to the jointly scheduled potential terminal exists. For example, the network device sends a downlink signal, including a first signal, a second signal, and a third signal, on the at least one first resource block group. The first signal is a signal sent by the network device to the target terminal, and the second signal and the third signal are signals, namely, interfering signals of the target terminal, sent by the network device to another terminal. In addition, the first signal is sent by using a DMRS port 0, the second signal is sent by using a DMRS port 4, and the third signal is sent by using a DMRS port 5. The network device configures, for the target terminal, three first resource block groups that are respectively first resource block groups 0 to 2 to transmit the first signal. The network device configures, for another terminal device, the first resource block groups 0 and 1 to transmit the second signal and the first resource block group 1 to transmit the third signal. Because the first resource block group 1 includes two interfering DMRS ports: the DMRS port 4 (sending the third signal) and the DMRS port 5 (sending the fourth signal), and is a resource block group on which the strong interfering signal exists, the second indication information indicates that the first resource block group 1 is the second resource block group.

In this embodiment of this application, an optional implementation of the second indication information is: The second indication information indicates at least one second resource block group by using a bitmap. A length of the bitmap is N bits, and a value of N is equal to a quantity of resource block groups included in one or more first resource block groups, or a value of N is a quantity of resource blocks included in one or more first resource block groups. If a bit in the bitmap is set to 1, it indicates that a resource block group corresponding to the bit is the second resource block group, or it indicates that a resource block corresponding to the bit is included in the second resource block group. Otherwise, it indicates that a resource block group corresponding to the bit is not the second resource block group, or it indicates that a resource block group corresponding to the bit is not included in the second resource block group. Details are shown in Table 4.

TABLE 4

| Bitmap configuration of the second indication information | Indicates a number of the second resource block group |
| --- | --- |
| [1000] | Resource block group 0 |
| [0100] | Resource block group 1 |
| [0010] | Resource block group 2 |
| [0001] | Resource block group 3 |

For a case in which the at least one second resource block group includes four second resource block groups, where the resource block groups are numbered from 0 to 3, the field length corresponding to the second indication information is 4 bits. Details are shown in Table 4. The value [1000] of the second indication information indicates the resource block group 0, the value [0100] indicates the resource block group

1, the value [0010] indicates the resource block group 2, and the value [0001] indicates the resource block group 3.

Another optional indication manner of the second indication information is: The second indication information indicates at least one second resource block group by using an index. The second indication information is an index value, and the index value corresponds to one or more numbers of one or more first resource block groups, or the index value corresponds to one or more numbers of one or more resource blocks. The field length N of the second indication information is determined by K states of a second resource block group combination, and may indicate one of the K states. Details are shown in Table 5.

TABLE 5

| Configuration of the second indication information | Indicates a number of the second resource block group |
| --- | --- |
| [00] | Resource block group 0 |
| [01] | Resource block group 1 |
| [10] | Resource block group 2 |
| [11] | Resource block group 3 |

For a case in which the at least one second resource block group includes four second resource block groups, where the resource block group are numbered from 0 to 3, and the second resource block group combination has K=(1, 4) states in total, the field length corresponding to the second indication information is $N=\lceil \log 2(1,4) \rceil = 2$ bits. Details are shown in Table 5. The value [00] of the second indication information indicates the resource block group 0, the value [01] indicates the resource block group 1, the value [10] indicates the resource block group 2, and the value [11] indicates the resource block group 3.

After receiving the second indication information, the terminal determines, based on the second indication information, that the resource block group on which the strong interfering signal exists is the second resource block group, and further processes a downlink signal based on the second resource block group. The downlink signal herein is a downlink signal carried on the first resource block group, namely, a downlink signal sent by the network device to the target terminal.

Optionally, that the downlink signal is processed based on the second indication information may include the following steps.

3021: The terminal determines, based on the second resource block group, a third DMRS port associated with the strong interfering signal corresponding to the downlink signal, or the terminal determines a third DMRS port associated with the signal corresponding to the jointly scheduled terminal corresponding to the downlink signal.

This Step Includes:

The target terminal detects all or some of DMRS ports in a DMRS port set on the second resource block group;

the target terminal determines a detection result or a channel coefficient of a first DMRS port, where the first DMRS port is a DMRS port associated with a downlink signal sent by the network device to the target terminal; and the target terminal determines a third DMRS port based on detection results or channel coefficients of all or some of DMRS ports in the DMRS port set on the second resource block group, where the third DMRS port is a DMRS port, other than the first DMRS port, whose channel coefficient is the largest or greater than a preset threshold.

For example, the network device determines that the third resource block group corresponds to 12 DMRS ports, where the DMRS ports are numbered from 0 to 11. A DMRS port associated with a downlink signal sent by the network device to the terminal device is the DMRS port 0. The terminal detects DMRSs of the 12 DMRS ports on the third resource block group, and determines a channel coefficient of the DMRS port 0 and channel coefficients of the DMRS ports 1 to 11, where the channel coefficient of the DMRS port 6 is the largest. Therefore, it is determined that the DMRS port 6 is the second DMRS port, namely, the DMRS port corresponding to the strong interfering signal.

3022: Demodulate, based on the first DMRS port associated with the downlink signal and the third DMRS port, the downlink signal carried on the first resource block group.

This step may include:

The target terminal detects the first DMRS port and the third DMRS port on the third resource block group. The third resource block group is a complementary set of the second resource block group in the first resource block group, or is a resource block group different from the second resource block group in the first resource block group. The target terminal demodulates, based on detection results or channel coefficients of the first DMRS port and the third DMRS port on the third resource block group, a downlink signal that is carried on the third resource block group and that is sent by the network device to the target terminal.

The target terminal demodulates, based on detection results or channel coefficients of the first DMRS port and the third DMRS port on the second resource block group, a downlink signal that is carried on the second resource block group and that is sent by the network device to the target terminal.

It should be understood that the detection results or channel coefficients of the first DMRS port and the third DMRS port on the second resource block group have been obtained in step 3021.

It should be understood that the demodulation process includes interference suppression processing.

It should be understood that the third resource block group is a resource block group on which no potential strong interference exists, but potential interference still exists on the third resource block group. Therefore, interference suppression processing is to be performed. Therefore, the downlink signal is demodulated based on the detection results and channel information of the first DMRS port and the third DMRS port.

It should be understood that a demodulated downlink signal on the second resource block group and a demodulated downlink signal on the third resource block group form a demodulated downlink signal on the first resource block group, namely, a demodulated downlink signal sent by the network device to the target terminal.

It can be learned that in this embodiment of this application, the second resource block group indicated by the second indication information is a part of resource block group that is in the first resource block group and on which the strong interfering signal exists. In a signal processing process, the third DMRS port associated with the interfering signal that is to be suppressed can be obtained only by detecting all or some of DMRS ports in a DMRS port set of the second resource block group. The target terminal may obtain, based on the first DMRS port and the third DMRS port, a downlink signal obtained after interference suppression processing or the demodulated downlink signal on the first resource block group, where the demodulation process includes interference suppression processing. In this process, only a few DMRS ports and the part of resource block group are to be demodulated to obtain signals. This improves efficiency of interfering signal suppression. In addition, the second resource block group on which the strong interfering signal exists is indicated, so that the network device does not need to indicate one or more DMRS ports associated with an interfering signal on each first resource block group, to avoid redundant signaling overheads.

In the optional case (3), the second resource block group includes at least one third resource block group and at least one fourth resource block group, where the third resource block group is a resource block group on which the strong interfering signal exists or a resource block group on which the signal corresponding to the jointly scheduled potential terminal exists, and the fourth resource block group is a resource block group on which no relatively strong interfering signal or interfering signal exists or a resource block group on which no signal corresponding to the jointly scheduled potential terminal exists. A total quantity of resource block groups included in the third resource block group and the fourth resource block group is less than a total quantity of first resource block groups. The strong interfering signal is an interfering signal whose signal strength or receive power is greater than a third preset threshold, and the relatively strong interfering signal is an interfering signal whose signal strength or receive power is greater than a fourth preset threshold. The fourth preset threshold is less than the third interference threshold, and the fourth preset threshold may be 0.

Optionally, the network device determines at least one third resource block group and at least one fourth resource block group, where a quantity of DMRS ports corresponding to potential interference on the third resource block group is greater than a quantity of DMRS ports corresponding to potential interference on the first resource block group except the second resource block group; or a DMRS port set corresponding to potential interference on the first resource block group except the second resource block group is a subset of a DMRS port set corresponding to potential interference on the second resource block group, and a quantity of DMRS ports corresponding to potential interference on the fourth resource block group is less than a quantity of DMRS ports corresponding to potential interference on the first resource block group except the second resource block group; or a quantity of DMRS ports corresponding to potential interference greater than a preset threshold on the fourth resource block group is zero. It should be understood that, that the third resource block group has the strong interfering signal means that a quantity of interfering DMRS ports (DMRS ports corresponding to the interfering signal) corresponding to the signal on the third resource block group is greater than a quantity of interfering DMRS ports on another resource block group. That the fourth resource block group has no strong interfering signal includes two meanings: There are few interfering signals on the fourth resource block group, or there is no interfering signal on the fourth resource block group. If there are few interfering signals on the fourth resource block group, it means that a quantity of interfering DMRS ports corresponding to the signals on the fourth resource block group is less than a quantity of interfering DMRS ports on the another resource block group. If there is no interfering signal on the fourth resource block group, it means that a quantity of interfering DMRS ports corresponding to the signals on the fourth resource block group is 0. For example, the network device assigns eight RBs to carry a first signal to be sent to the terminal device, where the RBs are numbered from 0 to 7. The network device determines that the eight RBs are grouped into four first resource block groups, where the first resource block groups are numbered from 0 to 3. The first resource block group 0 includes the RBs 0 and 1, the first resource block group 1 includes the RBs 2 and 3, the first resource block group 2 includes the RBs 4 and 5, and the first resource block group 3 includes the RBs 6 and 7. A DMRS port of the terminal user is a DMRS port 0. In addition, the network device determines that the RBs 0 to 5 carry a downlink signal to be sent to a second terminal, and a DMRS port corresponding to the second terminal user is a DMRS port 5. The network device determines that the RBs 0 and 1 carry a downlink signal to be sent to a third terminal, and a DMRS port corresponding to the third terminal user is a DMRS port 6. In this case, the network device may determine that a quantity of DMRS ports corresponding to potential interference existing on the first resource block group 0 is 2, a quantity of DMRS ports corresponding to potential interference existing on first resource blocks 1 and 2 is 1, and a quantity of DMRS ports corresponding to potential interference existing on the first resource block group 3 is 0. The terminal device determines that the third resource block group is the first resource block group 0, and the fourth resource block group is the first resource block group 3.

After determining the second resource block group, the network device also indicates the second resource block group by using the second indication information in this embodiment of this application.

Optionally, the second indication information includes a field indicating a second resource block set, and the second resource block set includes a third resource block set and a fourth resource block set. An optional indication manner of the second indication information is: The second indication information indicates at least one second resource block group by using an index, and the second resource block group includes at least one third resource block group and at least one fourth resource block group. The second indication information may be an index value, and the index value may correspond to a number of one or more first resource block groups, or the index value may correspond to a number of one or more resource blocks. The field length N of the second indication information is determined by K states of a second resource block group combination, and may indicate one of the K states.

For example, for a case in which the at least one first resource block group includes four first resource block groups, where the resource block group are numbered from 0 to 3, when the at least one second resource block group includes a third resource block group and a fourth resource block group, the second resource block group combination has K=(1,4)*(1,3) states in total. (P, Q) represents a combination for selecting P from Q, for example, selecting P second resource block groups from Q first resource block groups. In this case, the field length corresponding to the second indication information is N=⌈log2(1,4)*(1,3)⌉=4 bits. Details are shown in the following Table 6.

TABLE 6

| Configuration of the second indication information | Indicates a number of a third resource block group | Indicates a number of a fourth resource block |
|---|---|---|
| [0000] | Resource block group 0 | Resource block group 1 |
| [0001] | Resource block group 0 | Resource block group 2 |
| [0010] | Resource block group 0 | Resource block group 3 |
| [0011] | Resource block group 1 | Resource block group 0 |
| [0100] | Resource block group 1 | Resource block group 2 |
| [0101] | Resource block group 1 | Resource block group 3 |
| [0110] | Resource block group 2 | Resource block group 0 |
| [0111] | Resource block group 2 | Resource block group 1 |
| [1000] | Resource block group 2 | Resource block group 3 |
| [1001] | Resource block group 3 | Resource block group 0 |
| [1010] | Resource block group 3 | Resource block group 1 |
| [1011] | Resource block group 3 | Resource block group 2 |

The value [0000] of the second indication information indicates that the resource block group 0 and the resource block group 1 are second resource block groups, where the resource block group 0 is the third resource block group, and the resource block group 1 is the fourth resource block group. The value [0001] indicates that the resource block group 0 and the resource block group 2 are second resource block groups, where the resource block group 0 is the third resource block group, and the resource block group 2 is the fourth resource block group. The value [0010] indicates that the resource block group 0 and the resource block group 3 are second resource block groups, where the resource block group 0 is the third resource block group, and the resource block group 3 is the fourth resource block group. The value [0011] indicates that the resource block group 1 and the resource block group 0 are second resource block groups, where the resource block group 1 is the third resource block group, and the resource block group 0 is the fourth resource block group. The value [0100] indicates that the resource block group 1 and the resource block group 2 are second resource block groups, where the resource block group 1 is the third resource block group, and the resource block group 2 is the fourth resource block group. The value [0101] indicates that the resource block group 1 and the resource block group 3 are second resource block groups, where the resource block group 1 is the third resource block group, and the resource block group 3 is the fourth resource block group. The value [0110] indicates that the resource block group 2 and the resource block group 0 are second resource block groups, where the resource block group 2 is the third resource block group, and the resource block group 0 is the fourth resource block group. The value [0111] indicates that the resource block group 2 and the resource block group 1 are second resource block groups, where the resource block group 2 is the third resource block group, and the resource block group 1 is the fourth resource block group. The value [1000] indicates that the resource block group 2 and the resource block group 3 are second resource block groups, where the resource block group 2 is the third resource block group, and the resource block group 3 is the fourth resource block group. The value [1001] indicates that the resource block group 3 and the resource block group 0 are second resource block groups, where the resource block group 3 is the third resource block group, and the resource block group 0 is the fourth resource block group. The value [1010] indicates that the resource block group 3 and the resource block group 1 are second resource block groups, where the resource block group 3 is the third resource block group, and the resource block group 1 is the fourth resource block group. The value [1011] indicates that the resource block group 3 and the resource block group 2 are second resource block groups, where the resource block group 3 is the third resource block group, and the resource block group 2 is the fourth resource block group.

Optionally, the second indication information includes two fields. A first field indicates the third resource block group, and a second field indicates the fourth resource block group. Same as the foregoing description, the second indication information may be located in the DCI, and may be located after the antenna port field in FIG. 3B. In addition, the first field and the second field in this embodiment of this application may also be indicated in the manners in the foregoing Table 1 to Table 5. Details are not described herein again.

A total quantity of resource block groups included in the third resource block group and the fourth resource block group is less than a total quantity of first resource block groups, in other words, a quantity of the third resource block group and the fourth resource block group is a subset of the first resource block group. For example, first resource block groups are first resource block groups 0 to 2. A third resource block group may be the first resource block group 0, and it indicates that an interfering signal on the first resource block group 0 is greater than or equal to a third preset threshold. A fourth resource block group may be the first resource block group 1, and it indicates that an interfering signal on the first resource block group 1 is 0, or is a minimum value less than a fourth preset threshold. An interfering signal mapped to the first resource block group 2 that is not indicated may be neither greater than or equal to the third preset threshold, nor less than the fourth preset threshold.

Optionally, that the downlink signal is processed based on the second indication information includes:

3031: The terminal determines a fifth resource block group other than the second resource block group in the first resource block group based on the second resource block group indicated by the second indication information, where the second resource block group includes at least one third resource block group and at least one fourth resource block group, and a quantity of resource blocks included in the third resource block group and the fourth resource block group is less than a quantity of resource blocks in the first resource block group.

The fifth resource block group is a resource block group other than the second resource block group in the first resource block group. In other words, the fifth resource block group is a complementary set of the second resource block group in the first resource block group. For example, first resource block groups are first resource block groups 0 to 2, a second resource block group is the first resource block group 0, and third resource block groups are the first resource block group 1 and the first resource block group 2.

It should be understood that the third resource block group is a resource block group on which the strong interfering signal exists, and the fourth resource block group is a resource block group on which no strong interfering signal exists. In this case, an interfering signal exists, but no strong interfering signal exists on the fifth resource block group. Therefore, interference suppression processing is performed when a downlink signal on the fifth resource block group is demodulated.

3032: The terminal determines, based on the third resource block group indicated by the second indication information, a fourth DMRS port associated with the strong interfering signal in the downlink signal.

This step may include:

The target terminal detects all or some of DMRS ports in a DMRS port set on the third resource block group;

the target terminal determines a detection result or a channel coefficient of a first DMRS port on the third resource block group, where the first DMRS port is a DMRS port associated with a downlink signal sent by the network device to the target terminal; and the target terminal determines a fourth DMRS port based on detection results or channel coefficients of all or some of DMRS ports in the DMRS port set on the third resource block group, where the fourth DMRS port is a DMRS port, other than the first DMRS port, whose channel coefficient is the largest or greater than a preset threshold.

For example, the network device determines that the third resource block group corresponds to 12 DMRS ports, where the DMRS ports are numbered from 0 to 11. A DMRS port associated with a downlink signal sent by the network device to the terminal device is the DMRS port 0. The terminal detects DMRSs of the 12 DMRS ports on the third resource block group, and determines a channel coefficient of the DMRS port 0 and channel coefficients of the DMRS ports 1 to 11, where the channel coefficient of the DMRS port 6 is the largest. Therefore, it is determined that the DMRS port 6 is the fourth DMRS port, namely, the DMRS port corresponding to the strong interfering signal.

3033: The terminal demodulates a downlink signal on the third resource block group and a downlink signal on the fifth resource block group based on the first DMRS port associated with the downlink signal and the fourth DMRS port. Alternatively, the terminal demodulates the downlink signal on the first resource block group except the fourth resource block group based on the first DMRS port associated with the downlink signal and the fourth DMRS port.

This step may include the following steps:

The target terminal detects the first DMRS port and the fourth DMRS port on the fifth resource block group;

the target terminal demodulates the downlink signal on the third resource block group based on detection results or channel coefficients of the first DMRS port and the fourth DMRS port on the third resource block group; and the target terminal demodulates the downlink signal on the fifth resource block group based on detection results or channel coefficients of the first DMRS port and the fourth DMRS port on the fifth resource block group.

It should be understood that the detection results or the channel coefficients of the first DMRS port and the fourth DMRS port on the third resource block group have been obtained in step 3032.

It should be understood that the demodulation process includes interference suppression processing.

It should be understood that the fifth resource block group is a resource block group on which potential interference exists. Therefore, interference suppression processing further is to be performed. Therefore, the downlink signal is demodulated based on the detection results and channel information of the first DMRS port and the fourth DMRS port.

3034: The terminal demodulates, based on the first DMRS port, a downlink signal carried on the fourth resource block group.

This step may include the following steps:

The target terminal detects a first DMRS port on the fourth resource block group; and the target terminal demodulates the downlink signal on the fourth resource block group based on a detection result or a channel coefficient of the first DMRS port on the fourth resource block group.

It should be understood that the fourth resource block group is a resource block group that does not include the strong interfering signal, and the downlink signal on the fourth resource block group may be obtained by demodulating the downlink signal on the fourth resource block group based on the coefficient of the first DMRS port. In addition, the downlink signal is a mapping, on a fourth resource block group, of a first signal sent by the network device to the target terminal.

A demodulated downlink signal on the first resource block group may be determined based on a demodulated downlink signal on the fourth resource block group and demodulated downlink signals on the third resource block group and the fifth resource block group. It should be understood that the demodulation includes an interference suppression process.

It can be learned that in this embodiment of this application, the third resource block group on which strong interference exists and the fourth resource block group on which no strong interference exists are simultaneously indicated as second resource block groups, and the target terminal performs blind detection only on the indicated third resource block group, to reduce a quantity of times of blind detection. In addition, interference suppression does not need to be performed on the indicated fourth resource block group. This reduces complexity of terminal processing. In addition, the second resource block group is indicated, and the third resource block group on which strong interference exists and the fourth resource block group on which no strong interfering signal exists are indicated, so that the network device does not need to indicate one or more DMRS ports associated with an interfering signal on each first resource block group, to avoid redundant signaling overheads.

Figure 4:
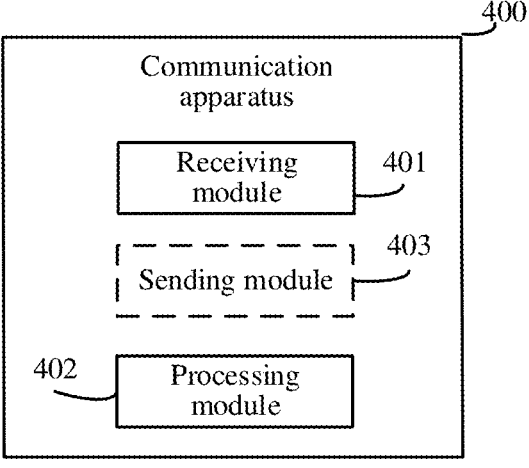
FIG. 4 is a block diagram of a structure of a communication apparatus according to an embodiment of this application.

FIG. 4 shows a communication apparatus 400 according to an embodiment of this application. The communication apparatus may be configured to perform the signal processing method applied to a terminal and the embodiments in FIG. 3A to FIG. 3C. The terminal may be a terminal or a chip that may be configured in the terminal. The communication apparatus includes a receiving module 401 and a processing module 402.

The receiving module 401 is configured to receive first indication information and second indication information, where the first indication information indicates at least one first resource block group, the second indication information indicates a second resource block group, and the second resource block group belongs to the at least one first resource block group.

The receiving module 401 is further configured to receive a downlink signal on the at least one first resource block group.

The processing module 402 is configured to process the downlink signal based on the second indication information.

Optionally, the second resource block group is a resource block group on which no strong interfering signal exists, or a resource block group on which no signal corresponding to a jointly scheduled potential terminal exists.

Optionally, the processing module 402 is configured to: determine a third resource block group other than the second resource block group in the at least one first resource block group based on the second indication information; demodulate, based on a first demodulation reference signal DMRS port associated with the downlink signal and a second DMRS port associated with an interfering signal corresponding to the downlink signal, a downlink signal carried on the third resource block group; and demodulate, based on the first DMRS port associated with the downlink signal, a downlink signal carried on the second resource block group.

Optionally, the second resource block group is a resource block group on which a strong interfering signal exists, or a resource block group on which a signal corresponding to a jointly scheduled potential terminal exists.

The second resource block group is used by the terminal to determine a DMRS port associated with the strong interfering signal corresponding to the downlink signal, or used by the terminal to determine a DMRS port associated with the signal corresponding to the jointly scheduled terminal corresponding to the downlink signal.

Optionally, the processing module 402 is configured to:

determine, based on the second resource block group indicated by the second indication information, a third DMRS port associated with an interfering signal corresponding to the downlink signal; and demodulate, based on a first DMRS port associated with the downlink signal and the third DMRS port, the downlink signal carried on the first resource block group.

Optionally, the first indication information and the second indication information are carried in same downlink control information DCI.

Optionally, the processing module 402 may be a chip, an encoder, an encoding circuit, or another integrated circuit that can implement the method in this application.

Optionally, the communication apparatus 400 may further include a sending module 403, and the receiving module 401 and the sending module 403 may be an interface circuit or a transceiver. The receiving module 401 and the sending module 403 may be independent modules, or may be integrated into a transceiver module (not shown in the figure). The transceiver module may implement functions of the foregoing receiving module 401 and sending module 403. The transceiver module may be an interface circuit or a transceiver.

A method and embodiment have been described above, and the apparatus 400 is configured to perform the signal processing method corresponding to the terminal. Therefore, for specific descriptions related to the method, refer to a related part in the corresponding embodiment. Details are not described herein again.

Optionally, the apparatus 400 may further include a storage module (not shown in the figure). The storage module may be configured to store data and/or signaling, and the storage module may be coupled to the processing module 402, or may be coupled to the receiving module 401 or the sending module 403. For example, the processing module 402 may be configured to read data and/or signaling in the storage module, so that the signal processing method in the foregoing method embodiment is performed.

Figure 5:
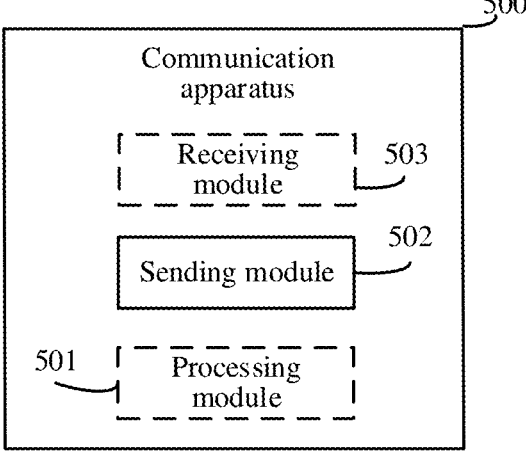
FIG. 5 is a block diagram of a structure of another communication apparatus according to an embodiment of this application.

FIG. 5 shows another communication apparatus 500 according to an embodiment of this application. The communication apparatus may be configured to perform the signal processing method applied to a network device and the embodiments in FIG. 3A to FIG. 3C. The apparatus may be a network device or a chip that may be configured in the network device. In a possible implementation, as shown in FIG. 5, the communication apparatus 500 includes a sending module 502.

The sending module 502 is configured to send first indication information and second indication information, where the first indication information indicates at least one first resource block group, the second indication information indicates a second resource block group, and the second resource block group belongs to the at least one first resource block group.

The sending module 502 is further configured to send a downlink signal on the at least one first resource block group.

Optionally, the second resource block group is a resource block group on which no strong interfering signal exists, or a resource block group on which no signal corresponding to a jointly scheduled potential terminal exists.

Optionally, the second resource block group is a resource block group on which a strong interfering signal exists, or a resource block group on which a signal corresponding to a jointly scheduled potential terminal exists.

Optionally, the sending module 502 sends the first indication information and the second indication information by using same DCI.

Optionally, the sending module 502 is further configured to: a network device sends the first indication information and the second indication information when a quantity of first CDM groups is less than a quantity of second CDM groups, where the first CDM group is a CDM group including one or more first DMRS ports, and the second CDM group is a CDM group that is configured by the network device and that does not carry data.

Optionally, the communication apparatus 500 may further include a processing module 501. The processing module 501 may be a chip, an encoder, an encoding circuit, or another integrated circuit that can implement the method in this application.

Optionally, the communication apparatus 500 may further include a receiving module 503, and the receiving module 503 and the sending module 502 may be an interface circuit or a transceiver. The receiving module 503 and the sending module 502 may be independent modules, or may be integrated into a transceiver module (not shown in the figure). The transceiver module may implement functions of the foregoing receiving module 503 and sending module 502. The transceiver module may be an interface circuit or a transceiver.

A method and embodiment have been described above, and the apparatus 500 is configured to perform the signal processing method corresponding to the network device. Therefore, for specific descriptions related to the method, refer to a related part in the corresponding embodiment. Details are not described herein again.

Optionally, the apparatus 500 may further include a storage module (not shown in the figure). The storage module may be configured to store data and/or signaling, and the storage module may be coupled to the processing module 501, or may be coupled to the receiving module 503 or the sending module 502. For example, the processing module 501 may be configured to read data and/or signaling in the storage module, so that the signal processing method in the foregoing method embodiment is performed.

Figure 6:
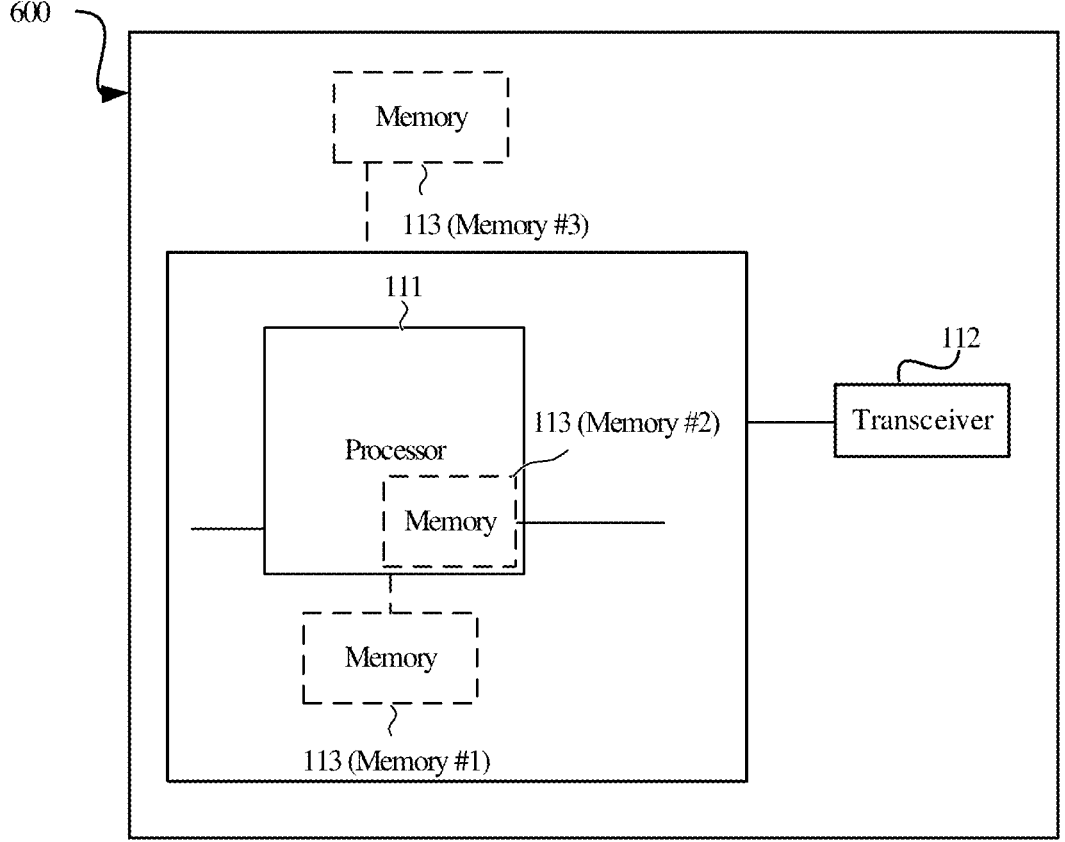
FIG. 6 is a schematic diagram of a structure of a communication apparatus according to an embodiment of this application.

FIG. 6 is a block diagram of a structure of a communication apparatus 600 according to an embodiment of this application. It should be understood that the communication apparatus 600 can perform steps performed by the terminal or the network device in the signal processing method in FIG. 3A to FIG. 3C. To avoid repetition, details are not described herein again. The communication apparatus 600 includes a processor 111 and a memory 113, where the processor 111 and the memory 113 are electrically coupled.

The memory 113 is configured to store computer program instructions. Optionally, the memory 113 (Memory #1) is located in the apparatus, the memory 113 (Memory #2) is integrated with the processor 111, or the memory 113 (Memory #3) is located outside the apparatus.

The processor 111 is configured to execute some or all of computer program instructions in the memory, and when the some or all of the computer program instructions are executed, the apparatus is enabled to perform the method in any one of the foregoing embodiments.

Optionally, the apparatus further includes a transceiver 112, configured to communicate with another device, for example, send first indication information and second indication information, where the first indication information indicates at least one first resource block group, the second indication information indicates a second resource block group, and the second resource block group belongs to the at least one first resource block group.

It should be understood that the communication apparatus 600 shown in FIG. 6 may be a chip or a circuit, for example, a chip or a circuit that may be disposed in the terminal apparatus or the communication apparatus. Alternatively, the transceiver 112 may be a communication interface. The transceiver includes a receiver and a transmitter. Further, the communication apparatus 600 may include a bus system.

The processor 111, the memory 113, and the transceiver 112 are connected through the bus system. The processor 111 is configured to execute the instructions stored in the memory 113, to control the transceiver to receive a signal and send a signal, to complete the steps of the first device or the second device in the implementation method in this application. The memory 113 may be integrated into the processor 111, or may be disposed separately from the processor 111.

In an implementation, it may be considered that functions of the transceiver 112 are implemented by using a transceiver circuit or a dedicated transceiver chip. It may be considered that the processor 111 is implemented by using a dedicated processing chip, a processing circuit, a processor, or a general-purpose chip. The processor may be a central processing unit ( ), a network processor (NP), or a combination of the CPU and the NP. The processor may further include a hardware chip or another general-purpose processor. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL) and another programmable logic device, a discrete gate or a transistor logic device, a discrete hardware component, or any combination thereof. The general-purpose processor may be a microprocessor, or the processor may be any conventional processor, or the like.

It should be further understood that the memory mentioned in embodiments of this application may be a volatile memory or a non-volatile memory, or may include the volatile memory and the non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory described in this application aims to include but is not limited to these memories and any memory of another proper type.

An embodiment of this application provides a computer storage medium. The computer storage medium stores a computer program, and the computer program includes instructions used to perform the method corresponding to the terminal in the foregoing embodiment.

An embodiment of this application provides a computer storage medium. The computer storage medium stores a computer program, and the computer program includes instructions used to perform the method corresponding to the network device in the foregoing embodiment.

An embodiment of this application provides a computer program product including instructions. When the computer program product runs on a computer, the computer is enabled to perform the method corresponding to the terminal in the foregoing embodiment.

An embodiment of this application provides a computer program product including instructions. When the computer program product runs on a computer, the computer is enabled to perform the method corresponding to the network device in the foregoing embodiment.

It should be understood that numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that units and algorithm steps in the examples described with reference to embodiments disclosed in this specification may be implemented by electronic hardware or a combination of computer software and the electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the method described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely example implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal processing method, comprising:
   receiving first indication information and second indication information, wherein the first indication information indicates at least one first resource block group, the second indication information indicates a second resource block group, and the second resource block group belongs to the at least one first resource block group;
   receiving a downlink signal on the at least one first resource block group; and
   processing the downlink signal based on the second indication information,
   wherein the processing the downlink signal based on the second indication information comprises:
      determining a third resource block group other than the second resource block group in the at least one first resource block group based on the second indication information;
      demodulating, based on a first demodulation reference signal (DMRS) port associated with the downlink signal and a second DMRS port associated with an interfering signal corresponding to the downlink signal, a downlink signal carried on the third resource block group; and
      demodulating, based on the first DMRS port associated with the downlink signal, a downlink signal carried on the second resource block group.

2. The signal processing method according to claim 1, wherein the second resource block group is a resource block group on which no strong interfering signal exists, or a resource block group on which no signal corresponding to a jointly scheduled potential terminal exists.

3. The signal processing method according to claim 1, wherein the second resource block group is a resource block group on which a strong interfering signal exists, or a resource block group on which a signal corresponding to a jointly scheduled potential terminal exists.

4. The signal processing method according to claim 3, wherein the processing the downlink signal based on the second indication information comprises:

determining, based on the second resource block group indicated by the second indication information, a third demodulation reference signal (DMRS) port associated with an interfering signal corresponding to the downlink signal; and demodulating, based on a first DMRS port associated with the downlink signal and the third DMRS port, the downlink signal carried on the first resource block group.

5. A signal processing method, comprising:

sending first indication information and second indication information, wherein the first indication information indicates at least one first resource block group, the second indication information indicates a second resource block group, and the second resource block group belongs to the at least one first resource block group; and sending a downlink signal on the at least one first resource block group, wherein the sending the first indication information and the second indication information, comprises:

sending the first indication information and the second indication information in response to a quantity of first code division multiplexing (CDM) groups being less than a quantity of second CDM groups, wherein the first CDM group is a CDM group comprising one or more first demodulation reference signal (DMRS) ports, and the second CDM group is a CDM group that does not carry data.

6. The signal processing method according to claim 5, wherein the second resource block group is a resource block group on which no strong interfering signal exists, or a resource block group on which no signal corresponding to a jointly scheduled potential terminal exists.

7. The signal processing method according to claim 5, wherein the second resource block group is a resource block group on which a strong interfering signal exists, or a resource block group on which a signal corresponding to a jointly scheduled potential terminal exists.

8. The signal processing method according to claim 5, wherein the first indication information and the second indication information are sent by using the same downlink control information.

9. A communication apparatus, comprising:

at least one processor; and a memory storing programming instructions that, when executed by the at least one processor, cause the communication apparatus to:

receive first indication information and second indication information, wherein the first indication information indicates at least one first resource block group, the second indication information indicates a second resource block group, and the second resource block group belongs to the at least one first resource block group;

receive a downlink signal on the at least one first resource block group; and process the downlink signal based on the second indication information, wherein the communication apparatus processes the downlink signal based on the second indication information by:

determining a third resource block group other than the second resource block group in the at least one first resource block group based on the second indication information;

demodulating, based on a first demodulation reference signal (DMRS) port associated with the downlink signal and a second DMRS port associated with an interfering signal corresponding to the downlink signal, a downlink signal carried on the third resource block group; and demodulating, based on the first DMRS port associated with the downlink signal, a downlink signal carried on the second resource block group.

10. The communication apparatus according to claim 9, wherein the second resource block group is a resource block group on which no strong interfering signal exists, or a resource block group on which no signal corresponding to a jointly scheduled potential terminal exists.

11. The communication apparatus according to claim 9, wherein the second resource block group is a resource block group on which a strong interfering signal exists, or a resource block group on which a signal corresponding to a jointly scheduled potential terminal exists.

12. The communication apparatus according to claim 11, wherein the communication apparatus processes the downlink signal based on the second indication information by:

determining, based on the second resource block group indicated by the second indication information, a third demodulation reference signal (DMRS) port associated with an interfering signal corresponding to the downlink signal; and demodulating, based on a first DMRS port associated with the downlink signal and the third DMRS port, the downlink signal carried on the first resource block group.

13. A communication apparatus, comprising:

at least one processor; and a memory storing programming instructions that, when executed by the at least one processor, cause the communication apparatus to:

send first indication information and second indication information, wherein the first indication information indicates at least one first resource block group, the second indication information indicates a second resource block group, and the second resource block group belongs to the at least one first resource block group; and send a downlink signal on the at least one first resource block group, wherein the communication apparatus sends the first indication information and the second indication information by:

sending the first indication information and the second indication information in response to a quantity of first code division multiplexing (CDM) groups being less than a quantity of second CDM groups, wherein the first CDM group is a CDM group comprising one or more first demodulation reference signal (DMRS) ports, and the second CDM group is a CDM group that does not carry data.

14. The communication apparatus according to claim 13, wherein the second resource block group is a resource block group on which no strong interfering signal exists, or a resource block group on which no signal corresponding to a jointly scheduled potential terminal exists.

15. The communication apparatus according to claim 13, wherein the second resource block group is a resource block group on which a strong interfering signal exists, or a resource block group on which a signal corresponding to a jointly scheduled potential terminal exists.

16. The communication apparatus according to claim 13, wherein the first indication information and the second indication information are sent by using the same downlink control information.

17. The signal processing method according to claim 1, wherein the first indication information and the second indication information are carried in the same downlink control information.

18. The signal processing method according to claim 1, wherein the signal processing method is performed by a terminal or a chip in a terminal.

19. The signal processing method according to claim 5, wherein the signal processing method is performed by a network device or a chip in a network device.

20. The communication apparatus according to claim 9, wherein the first indication information and the second indication information are carried in the same downlink control information.

\* \* \* \* \*